(12) United States Patent
Ashida et al.

(10) Patent No.: US 11,619,640 B2
(45) Date of Patent: Apr. 4, 2023

(54) METHOD FOR GENERATING AN INDEX FOR QUALITY CONTROL, APPARATUS FOR GENERATING A QUALITY CONTROL INDEX, QUALITY CONTROL DATA GENERATION SYSTEM, AND METHOD FOR CONSTRUCTING A QUALITY CONTROL DATA GENERATION SYSTEM

(71) Applicant: SYSMEX CORPORATION, Kobe (JP)

(72) Inventors: Mamoru Ashida, Kobe (JP); Motonari Daito, Kobe (JP); Fumiko Kino, Kobe (JP); Michiko Yoshimoto, Kobe (JP); Akane Seki, Kobe (JP); Kazuhiro Nakashima, Kobe (JP); Hideki Hirano, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 949 days.

(21) Appl. No.: 16/367,764

(22) Filed: Mar. 28, 2019

(65) Prior Publication Data
US 2019/0303361 A1 Oct. 3, 2019

(30) Foreign Application Priority Data
Mar. 29, 2018 (JP) .............................. JP2018-066070

(51) Int. Cl.
*G01N 35/00* (2006.01)
*G06F 16/22* (2019.01)
(Continued)

(52) U.S. Cl.
CPC . *G01N 35/00623* (2013.01); *G01N 35/00594* (2013.01); *G01N 35/00613* (2013.01);
(Continued)

(58) Field of Classification Search
CPC ....... G01N 35/00594; G01N 35/00613; G01N 35/00623; G01N 2035/00653;
(Continued)

(56) References Cited

U.S. PATENT DOCUMENTS

2011/0021368 A1   1/2011   Tammero et al.
2012/0042214 A1   2/2012   Jacobs et al.
(Continued)

FOREIGN PATENT DOCUMENTS

CN   101038293 A   9/2007
CN   102246047 A   11/2011
(Continued)

OTHER PUBLICATIONS

Notice of Reasons for Refusal dated Oct. 5, 2021, by the Japanese Patent Office in corresponding Japanese Patent Application No. 2018-066070 and an English translation of the Notice. (8 pages).
(Continued)

*Primary Examiner* — Benjamin R Schmitt
(74) *Attorney, Agent, or Firm* — Buchanan, Ingersoll & Rooney PC

(57) ABSTRACT

The method for generating an index for managing the analytical accuracy of a sample analyzer includes a step of acquiring a determination result related to whether a sample is positive or negative from a plurality of sample analyzers, and a step of generating an index based on a ratio of a sample determined to be positive or negative by the plurality of sample analyzers from a plurality of determination results obtained from the plurality of sample analyzers.

16 Claims, 33 Drawing Sheets

(51) Int. Cl.
*G06F 16/215* (2019.01)
*G06F 16/23* (2019.01)

(52) U.S. Cl.
CPC ............ *G06F 16/215* (2019.01); *G06F 16/22* (2019.01); *G06F 16/2365* (2019.01); *G01N 2035/00653* (2013.01); *G01N 2035/00673* (2013.01)

(58) Field of Classification Search
CPC .......... G01N 2035/00663; G01N 2035/00673; G06F 16/215
See application file for complete search history.

(56) References Cited

U.S. PATENT DOCUMENTS

| | | | |
|---|---|---|---|
| 2014/0199702 A1* | 7/2014 | Ebi | C12Q 1/6886 435/6.14 |
| 2017/0285624 A1 | 10/2017 | Lesher | |
| 2018/0046781 A1 | 2/2018 | Miyauchi et al. | |

FOREIGN PATENT DOCUMENTS

| | | |
|---|---|---|
| CN | 102768270 A | 11/2012 |
| CN | 103703367 A | 4/2014 |
| EP | 3 226 002 A1 | 10/2017 |
| JP | 2003-215122 A | 7/2003 |
| JP | 2004234459 A | 8/2004 |
| JP | 4290490 B2 | 4/2009 |
| JP | 2012-519280 A | 8/2012 |
| JP | 5658501 B2 | 12/2014 |
| JP | 2017-187473 A | 10/2017 |
| JP | 2018-025529 A | 2/2018 |
| WO | 2010/099170 A1 | 9/2010 |

OTHER PUBLICATIONS

Extended European Search Report dated Aug. 7, 2019, in a corresponding European Patent Application No. 19164292.5. (6 pages).
1st Notice of Reasons of Refusal dated Dec. 9, 2022, by the State Intellectual Property Office of the People's Republic of China in corresponding Chinese Patent Application No. 201910240184.1, and an English translation of the Notice. (28 pages).

* cited by examiner

FIG. 2

| Quality control information | Sample source of quality control information |
|---|---|
| Conventional | Positive control data<br>Negative control data<br>Calibrator |
| Present disclosure | Sample (multiple) |

FIG. 10

| | F1 | F2 | F3 | F4 | F5 | F6 | F7 | F8 | F9 | Positive control data | | Negative control data | | Item (CK19) Calibrator 1 | | Calibrator 2 | | Calibrator 3 | | F15 |
|---|---|---|---|---|---|---|---|---|---|---|---|---|---|---|---|---|---|---|---|---|
| | | | | | | | | | | F10 | | F11 | | F12 | | F13 | | F14 | | |
| | Reception no. | Date received | Time received | Facility code | Apparatus ID | Operational state error | Surgeon | Processing dept. | Reagent lot | Copy number | Rise time | Copy number | Rise time | Copy number | Rise time | Copy number | Rise time | Copy number | Rise time | Calibration curve slope |
| | 2263078 | 3/20 | 9:05 | H20 | H0003 | E02 | Taro | Management | A01 | 500 | 11 | 0 | — | 450 | 13 | 350 | 15 | 200 | 17 | -0.1 |
| | 2263079 | 3/20 | 9:06 | R10 | R0001 | S2 | Hanako | Standby | A01 | 510 | 10.5 | 0 | — | 450 | 13 | 350 | 15 | 200 | 17 | -0.12 |
| | 2263080 | 3/20 | 9:07 | R10 | R0001 | S1 | Hanako | Standby | A02 | 500 | 11 | 0 | — | 460 | 12.5 | 340 | 16 | 199 | 18 | -0.12 |

Reception No. 4100

| | F21 | F22 | F23 | F24 | F25 | F26 | F27 |

| Reception No. | Date received | Time received | Facility code | Apparatus ID | Sample ID | Test item CK19 |
|---|---|---|---|---|---|---|
| 2263078 | 3/20 | 9:05 | H20 | H0003 | 1 | Positive |
| 2263079 | 3/20 | 9:06 | R10 | R0001 | 2 | Negative |
| 2263080 | 3/20 | 9:07 | R10 | R0001 | 3 | Positive |
| 2263081 | 3/20 | 9:08 | H20 | H003 | 4 | Negative |
| 2263082 | 3/20 | 9:09 | H20 | H003 | 5 | Negative |
| | | | | | | |

FIG. 12

| | F31 | F32 | F33 | F34 | F35 | F36 | F37 | F38 | F39 | F40 |
|---|---|---|---|---|---|---|---|---|---|---|
| Reception No. | Date received | Time received | Facility code | Apparatus ID | Capacitance | Quantitative count | Reagent suction and discharge pressures | Environmental temperature | Reagent remainder |
| 2263078 | 3/20 | 9:05 | H20 | H0003 | ... | ... | ... | ... | ... |
| 2263079 | 3/20 | 9:06 | R10 | R0001 | ... | ... | ... | ... | ... |
| 2263080 | 3/20 | 9:07 | R10 | R0001 | ... | ... | ... | ... | ... |

| Reception No. | Date received | Time received | Facility code | Apparatus ID | Test item CK19 |
|---|---|---|---|---|---|
| | | | | | Ratio |
| 2263078 | 3/20 | 9:05 | H20 | H0003 | ... |
| 2263079 | 3/20 | 9:06 | R10 | R0001 | ... |
| 2263080 | 3/20 | 9:07 | R10 | R0001 | ... |
| | | | | | |

| Date/time | Sample ID | Item | Message |
|---|---|---|---|
| 2018/03/01 18:43:15 | 001[0X19-PC] | CX19 | Measurement error |
| 2018/03/01 18:43:19 | 001[X02] | CX19 | Measurement error |
| 2018/03/01 18:43:55 | 1 | CX19 | Control measurement failure |
| 2018/03/01 18:44:55 | 1 | CX19-0 | Measurement error |
| 2018/03/01 07:49:24 | Cal[C2] | CX19 | Control measurement failure |
| 2018/03/01 07:49:24 | 001[0X19-PC] | CX19 | Measurement error |
| 2018/03/01 07:49:24 | 001[X02] | CX19 | Measurement error |
| 2018/03/01 07:49:38 | Cal[C1] | CX19 | Control measurement failure |

Page 1 of 2    Display 1-10 of 13

FIG. 28

| Version information (Period : All) | |
|---|---|
| Program name | Program version | Program update date/time |
| EPD | 00-21 Baki0801 | 2018/01/22 15:47:15 |
| IPD | 00-20 Baki0813 | 2018/01/22 15:47:15 |
| Instrument Application | 00-21 Baki0801 | 2018/01/22 15:47:15 |
| Instrument Application | 00-20 Baki0804 | 2018/12/21 19:42:15 |
| Instrument BIOS | 00-01 Baki0804 | 2018/12/21 19:42:15 |
| Instrument Firmware | 00-03 Baki0808 | 2018/12/21 19:42:15 |
| Instrument Sequence | 00-21 Baki0154 | 2018/01/22 15:47:15 |
| Instrument Sequence | 00-20 Baki0154 | 2018/12/21 19:42:15 |

| Positive rate calculation result table (period : 3 months) | | | | | | | |
|---|---|---|---|---|---|---|---|
| Target | Total start | Total end | Apparatus number | Total number lymph nodes | Number negative | Number positive | Positive rate |
| All domestic facilities | 2017/11/10 | 2018/03/08 | 7 | 468 | 424 | 45 | 9.6% |
| In facility | 2018/03/23 | 2018/03/08 | 3 | 357 | 320 | 37 | 10.4% |
| This apparatus | 2018/01/23 | 2018/03/08 | 1 | 126 | 110 | 16 | 12.7% |

FIG. 32

| Pattern | Calibrator 1 | Calibrator 2 | Calibrator 3 | Positive control | Calibration curve slope | Capacitance | Reagent suction / discharge pressures | Estimated cause of failure |
|---|---|---|---|---|---|---|---|---|
| 1 | ○ | ○ | ○ | ○ | ○ | ○ | ○ | No failure |
| 2 | × | × | × | × | × | × | ○ | Pipette tip mounting failure or reagent failure |
| 3 | ○ | ○ | × | ○ | × | ○ | ○ | Calibrator failure |
| 4 | ○ | ○ | ○ | × | ○ | ○ | ○ | Control failure |

METHOD FOR GENERATING AN INDEX FOR QUALITY CONTROL, APPARATUS FOR GENERATING A QUALITY CONTROL INDEX, QUALITY CONTROL DATA GENERATION SYSTEM, AND METHOD FOR CONSTRUCTING A QUALITY CONTROL DATA GENERATION SYSTEM

CROSS REFERENCE TO RELATED APPLICATIONS

This application claims priority from Prior Japanese Patent Application No. 2018-066070, filed on Mar. 29, 2018, entitled "METHOD FOR GENERATING AN INDEX FOR QUALITY CONTROL, APPARATUS FOR GENERATING A QUALITY CONTROL INDEX, SAMPLE ANALYZER, QUALITY CONTROL DATA GENERATION SYSTEM, AND METHOD FOR CONSTRUCTING A QUALITY CONTROL DATA GENERATION SYSTEM", the entire contents of which are incorporated herein by reference.

FIELD OF THE INVENTION

The present disclosure relates to a method of generating an index for quality control, an apparatus for generating a quality control index, a quality control data generation system, and a method of constructing a quality control data generation system.

BACKGROUND

Japanese Patent No. 5658501 discloses a sample analysis system including a sample analyzer that is installed in a user's facility and has a measuring unit that shifts to a standby state when the power is turned on, wherein the sample analyzer automatically transmits report data to a management device when predetermined events occur, such events include the event of the transition of the measuring unit to a standby state when the power is turned on. The events include an event related to the measurement of the patient sample, an event related to the measurement of a standard sample for quality control or creation of a calibration curve, and an event related to approval of the quality control result or the created calibration curve.

SUMMARY OF THE INVENTION

In the system described in Japanese Patent No. 5658501, the quality control result or the created calibration curve data is transmitted from the sample analyzer to the management device. However, these data are generally data obtained by measuring standard samples such as an artificially prepared positive control, negative control, calibrator and the like. It is difficult to guarantee that the standard sample reflects the measurement accuracy when using the sample because the contained components and the like are strictly different from the sample collected from the subject. In the event that the measurement conditions have changed between when using the standard sample and when using the sample, it is difficult to detect such a phenomenon by the sample analysis system described in Japanese Patent No. 5658501. In order to detect such a phenomenon with quality control, it is necessary to perform quality control based on the measurement data of the sample measured by a sample analyzer on which quality control is performed.

Therefore, in this specification, a generation of quality control data for performing quality control of a sample analyzer based on measurement data of a sample is disclosed.

A first embodiment of the present disclosure relates to a generation method for generating an index for managing analysis accuracy of a sample analyzer. The generation method includes a step of acquiring a determination result regarding whether a sample is positive or negative from a plurality of sample analyzers, and a step of generating an index based on the ratio of the sample determined to be positive or negative by the plurality of sample analyzers from a plurality of determination results acquired from the plurality of sample analyzers. According to the present embodiment, it is possible to generate an index in order to perform quality control based on the measurement data of the sample.

A second embodiment of the present disclosure relates to a method of generating quality control data for managing analysis accuracy of a sample analyzer. The generation method includes a step of acquiring a determination result regarding whether a sample is positive or negative from a plurality of sample analyzers, a step of generating an index for quality control based on a ratio of a sample determined to be positive or negative by the plurality of sample analyzers from the plurality of determination results acquired from the plurality of sample analyzers, and a step of generating quality control data that can compare the index with the ratio of a sample determined to be positive or negative by the sample analyzer subject to analysis accuracy. According to the present embodiment, the quality control data can compare the ratio with the index.

A third embodiment of the present disclosure relates to an index generating apparatus (3000) for managing the analysis accuracy of a sample analyzer (2000). The generating apparatus (3000) includes a communication unit (710g) that acquires a determination result regarding whether a sample is positive or negative from a plurality of sample analyzers, and a processing unit (710a) for generating an index based on the ratio of the sample determined to be positive or negative by the plurality of determination results acquired from the plurality of sample analyzers. Preferably, the processing unit (710a) generates quality control data (4050) that can compare the index with the ratio of the sample determined to be positive or negative by the sample analysis device (2000) to be managed for analysis accuracy.

A fourth embodiment of the present disclosure relates to a quality control data generation system (7000) including a generating apparatus (3000) and a plurality of sample analyzers connected to the generating apparatus (3000).

A fifth embodiment of the present disclosure is a method for manufacturing a quality control data generation system (7000) including a step of preparing a generating apparatus (3000), and a step of preparing a plurality of sample analyzers (2000) connected to the generating apparatus.

In the first to fifth embodiments, preferably, the ratio is a positive ratio and/or negative ratio. It is possible to generate quality control data according to the presence or absence of a lesion reflected by the measurement data of the sample by using the positive ratio and/or the negative ratio. In the first to fifth embodiments, the quality control data also include data for indicating the ratio obtained from the sample analyzer to be managed together with the index. In this way it is possible to generate quality control data based on the measurement data of the sample. The plurality of sample analyzers may be installed in the same facility or may be installed in a plurality of facilities. Data for internal quality control can be generated by collecting the determination results for the same facility. It also is possible to generate external quality control data by collecting the determination results for multiple facilities.

In the first to fifth embodiments, preferably, the ratio obtained from the sample analyzer to be managed is calculated for each predetermined number of samples. In this way quality control can be performed without being affected by the reagent lot or the like.

The first to fifth embodiments also preferably include a step of acquiring information on a reagent lot, and the ratio obtained from the sample analyzer to be managed is calculated for each lot of reagent. The index also is updated every time the lot of a reagent for acquiring the measurement data of the sample is changed, such that it is possible to generate data for evaluating accuracy due to a difference in the reagent lot in this way.

The first to fifth embodiments are preferably updated each time a treatment method of a patient changes. In this way it is possible to cope with a change in the ratio of the presence or absence of a lesion accompanying a change in a treatment method.

In the first to fifth embodiments, the index preferably varies depending on the number of cumulative samples up to the point of generating the index. In this way it is possible to improve the appropriateness of the index.

In the first to fifth embodiments, the index preferably is calculated based on the average value of the ratios acquired from the plurality of sample analyzers by the time of generating the index. Preferably, the index is at least one selected from the upper limit value and the lower limit value of the confidence interval, and preferably the index is at least one selected from the upper limit value and the lower limit value of the 99.7% confidence interval. In this way it is possible to improve the appropriateness of the index.

In the first to fifth embodiments, the determination result preferably is acquired for a plurality of test items, and a ratio is acquired for each test item. In this way it is possible to generate quality control data based on the measurement data of the sample for each test item.

In the first to fifth embodiments, the quality control data preferably are displayed on a screen. Preferably, the quality control data are displayed on a screen in chronological order. In this way it is possible for the operator to evaluate the accuracy at a glance.

In the first to fifth embodiments, the quality control data include measurement data acquired from a standard sample by the sample analyzer to be managed. In this way it is easier to pursue the cause when poor quality control is evaluated by chance.

In the first to fifth embodiments, it is preferable that the sample analyzer is configured to analyze a tumor. More preferably, the sample analyzer is configured to analyze cancer metastasis. Still more preferably, the sample is a lymph node tissue. In this way it is possible to generate quality control data for test items related to a tumor which requires high reliability as a determination result.

The first to fifth embodiments preferably also include a step of acquiring identification information of a predetermined group, and the ratio is calculated for each predetermined group. Preferably, the predetermined group is set for each sample analyzer or for each facility where the sample analyzer is installed. In this way it is possible to generate quality control data within a predetermined group.

In the first to fifth embodiments, the quality control data preferably are user interface data for showing the ratio and the index obtained from the sample analyzer to be managed in a time-series graph. In this way usability can be improved.

An embodiment of the present disclosure relates to a quality control method for managing analysis accuracy of a sample analyzer including a step of evaluating the analysis accuracy of a sample analyzer to be managed based on the index. Preferably, in the step of evaluating the analysis accuracy of the sample analyzer to be managed, the analysis accuracy decreases when the ratio obtained from the sample analyzer to be managed deviates from the range indicated by the index. In this way quality control of the sample analyzer becomes possible.

BRIEF DESCRIPTION OF THE DRAWINGS

FIG. 2 is a diagram showing a difference between the prior art and the present disclosure;

FIG. 10 is a diagram showing an example of a calibrator-control database 4100;

FIG. 11 is a diagram showing an example of a determination result database 4010DB;

FIG. 12 is a diagram showing an example of a sample processing apparatus operation database 4040;

FIG. 13 is a diagram showing an example of a quality control information database 4050DB created for each facility;

Figure 19:
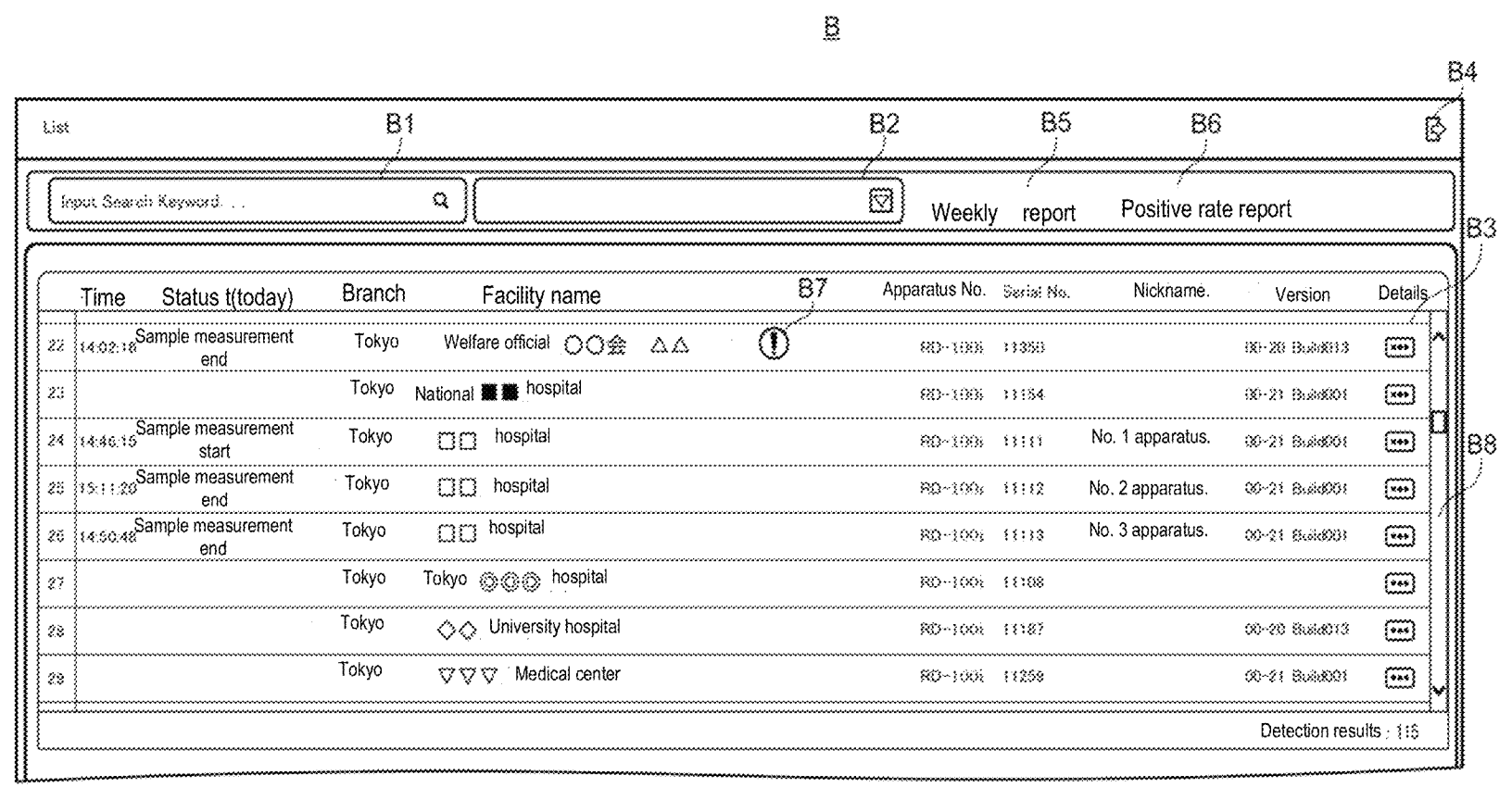

FIG. 19 is a diagram showing a list of facilities;

FIG. 24 is a display example of information shown in one area;

FIG. 28 is a display example of information indicated in one area;

FIG. 32 is a display example of information indicated in one area; and

DESCRIPTION OF THE EMBODIMENTS OF THE INVENTION

Figure 1:
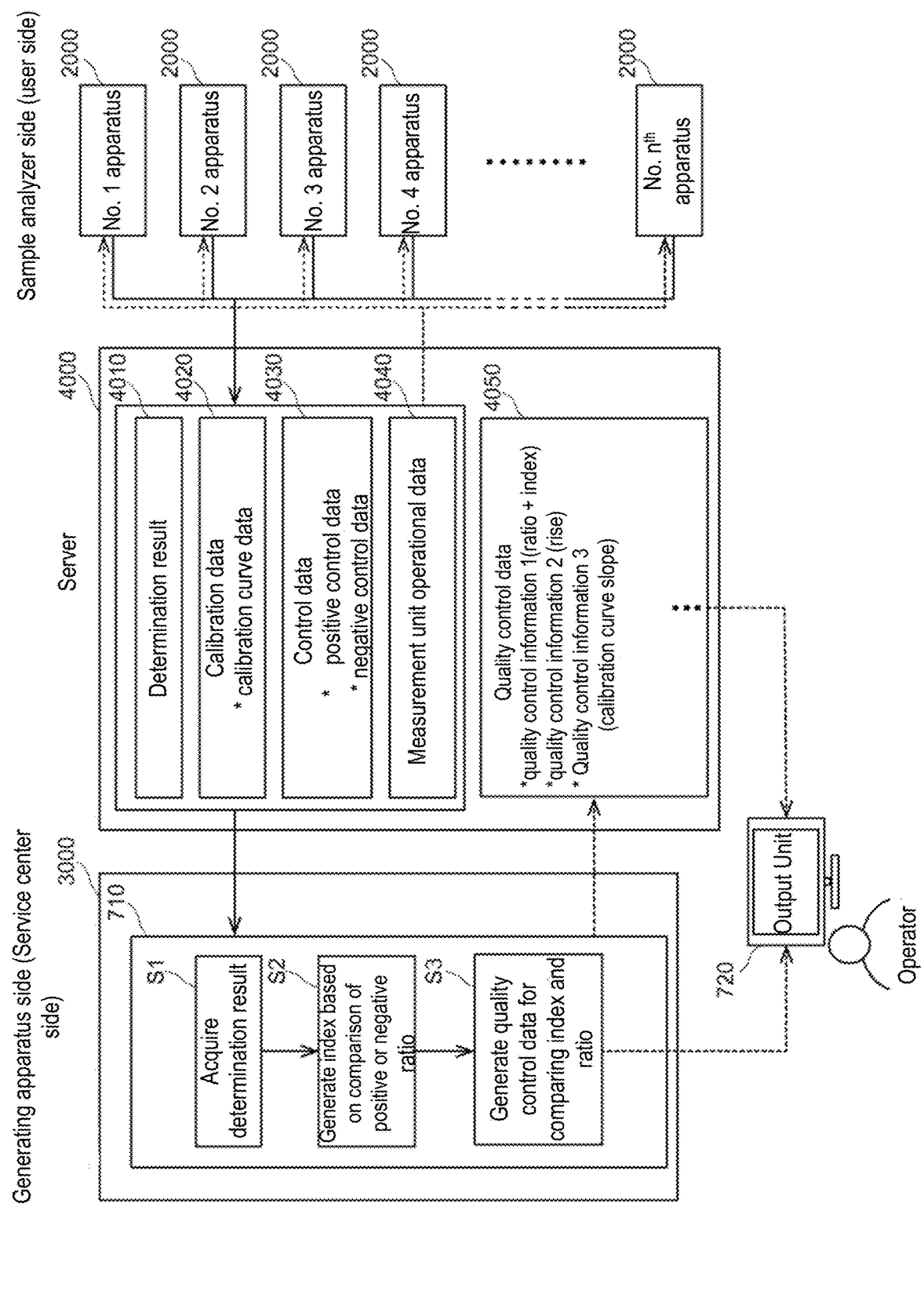
FIG. 1 is a schematic diagram of the present disclosure.

1. Index for Quality Control and Method for Generating Quality Control Data

First, an outline of a method for generating an accuracy index which is the first embodiment of the present disclosure will be described using the example shown in FIG. 1. The first embodiment relates to a method of generating an index for quality control for monitoring the analysis accuracy of a sample analyzer 2000 installed in a clinical laboratory, a clinical examination center or the like.

One or a plurality of sample analyzer 2000 is connected to an index generating apparatus 3000 (hereinafter also simply referred to as "generating apparatus 3000") for managing analysis accuracy of a sample analyzing apparatus installed in a management facility such as a service center, so as to be capable of communication through a network. This connection may be via a server 4000.

A determination result 4010 for determining whether a lesion is positive in the body of a human (for example, a patient) for each sample, and a standard sample (positive control, negative control, calibrator and the like) for each test item in order to monitor the analytical accuracy of the sample analyzer to be managed acquired by measurement by the sample analyzer, calibration data 4020 (including calibrator measurement data and calibration curve data such as rise time of turbidity, slope of calibration curve prepared from measurement data), control data 4030 including positive control and/or negative control data (including quantitative data and turbidity rise time), and operational data 4040 (referred to simply as "operational data" hereinafter) of the sample processing apparatus 2000 are acquired by the sample analyzer 2000. These data are transmitted to the generating apparatus 3000 either directly or via the server 4000.

The generating apparatus 3000 can acquire the determination result 4010, the calibration data 4020, the control data 4030, and the operational data 4040 from the sample analyzer 2000 directly or through the server 4000.

For example, generation of quality control data is created according to the following steps.

In step S1, a determination result 4010 regarding whether the sample is positive or negative, for example, the degree to which the lesion is positive, is acquired for a plurality of sample analyzers 2000. In step S2, based on the acquired determination results, the ratio of samples determined to be positive or negative is calculated by the plurality of sample analyzers and the sample analyzer to be managed for analysis accuracy based on a plurality of determination results acquired from a plurality of sample analysis apparatuses. An index for quality control is generated based on the ratio.

Preferably, quality control data 4050 (output data) are generated that can compare the index with the ratio obtained from the sample analyzer to be managed for analysis accuracy.

The output data are user interface data, and are output to, for example, an output unit 720 such as a screen via a web browser or the like, and can be viewed by an operator (administrator) or the like of the management facility. It is preferable that the user interface data indicates the ratio and the index in a time series graph.

Although FIG. 1 shows an example of a method of generating the quality control data 4050 using the generating apparatus 3000, part or all of the generation of the quality control data 4050 also may be performed by the operator.

As shown in FIG. 2, conventionally, measurement data obtained by measuring standard samples such as artificially prepared positive control, negative control, calibrator and the like are used as quality control information. Alternatively, in the present disclosure, the determination result acquired based on the measurement data of the sample is used for quality control since the quality control is performed based on the measurement data of the sample. In this way it is possible to evaluate whether accurate measurement can be made on the measurement of the sample itself.

In the present disclosure, a mammalian sample may be used instead of a human sample. Preferred mammals are monkeys, dogs, cats, rabbits and the like.

The sample is not limited insofar as it can be collected from the subject. Examples of samples include tissue, cells, serum, plasma, urine, cerebrospinal fluid, ascites, pleural effusion, saliva, gastric juice, pancreatic juice, bile, milk, interstitial fluid and the like.

The test item is not limited as long as it is an examination for detecting a lesion. Examples of lesions include ischemic diseases (especially the heart, brain, lung, large intestine and the like); allergic diseases such as allergic bronchitis and glomerulonephritis; dementia, Parkinson's disease, amyotrophic lateral sclerosis, myasthenia gravis (benign epithelial tumor, benign non-epithelial tumor, malignant epithelial tumor, malignant non-epithelial tumor); renal diseases such as acute kidney disease, chronic renal disease and the like; metabolic diseases (abnormal carbohydrate metabolism such as diabetes, abnormality of lipid metabolism, electrolyte abnormality); infectious diseases (bacteria, virus, rickettsia, chlamydia, fungi etc, protozoa, parasites) and the like can be mentioned as lesions. Neurodegenerative diseases including Alzheimer type (juvenile) dementia and cerebrovascular dementia; renal diseases such as chronic kidney disease; malignant epithelial or malignant non-epithelial tumor; metabolic diseases such as diabetes, fatty liver, obesity and the like are preferable as lesions. Particularly preferred are malignant tumors as lesions, and respiratory system malignant tumors (for example, squamous cell lung cancer, small cell lung cancer, large cell lung cancer, adenocarcinoma); malignant tumors originating from the trachea, bronchus or lung gastrointestinal malignancies generated from the nasopharynx, esophagus, stomach, duodenum, jejunum, ileum, cecum, appendix, ascending colon, transverse colon, sigmoid colon, rectum or anus; liver cancer; pancreatic cancer; urological malignancy that develops from the urinary bladder, the ureter or the kidney; female reproductive system malignant tumor arising from the ovary, fallopian tube and uterus and the like; breast cancer; prostate cancer; skin cancer; hypothalamus, pituitary gland, thyroid gland; endocrine system malignant tumor such as parathyroid gland, adrenal gland and the like; central nervous system malignant tumor; solid tumor such as malignant tumor arising from bone soft tissue. Preferable as malignant tumors are respiratory epithelial malignant tumor such as lung cancer (squamous cell carcinoma, small cell carcinoma, large cell carcinoma, adenocarcinoma) and the like; stomach cancer, duodenal cancer, colon cancer (S gastrointestinal epithelial malignancies such as colorectal cancer, rectal cancer and the like); liver cancer; pancreatic cancer; bladder cancer; thyroid cancer; ovarian cancer; breast cancer; prostate cancer. Most preferable are breast cancer, colon cancer, gastric cancer, and non-small cell lung cancer.

The tumor also includes metastatic cancer. Lymph tissue, peritoneal cavity, thoracic cavity, bone marrow, meningeal membrane, liver, lung and the like can be cited as the destination of cancer metastasis.

For example, the test items may be classified according to measurement principle. Examples of measurement principles include a nucleic acid detection method for measuring the presence or absence of a specific DNA sequence and the expression level of mRNA, an immunological measurement method for qualitative or quantitative determination of protein, and a biochemical measurement method for detecting the amount of enzyme activity or compound and the like. In the nucleic acid detection method, for example, the expression level of a cancer gene or the like can be measured by the RT-LAMP (Reverse Transcription-Loop-Mediated Isothermal Amplification) method, the quantitative RT-PCR method, the microarray method, the RNA-Seq method or the like. In the nucleic acid detection method, abnormality (mutation or the like) such as EGFR (epidermal growth factor receptor) gene or the like can be detected by the PCR method, the sequencing method or the like. In addition, it is also possible to use a blood count method in a blood sample by an electric resistance method and flow cytometry, a blood coagulability measurement method, a urinary qualitative method for detecting an enzyme activity in a urine sample or an amount of a compound, urinary solid component analysis method for detecting the solid components in a urine sample also may be included in the test items.

In the immunological assay method, tumor markers and the like can be measured by the ELISA (Enzyme-Linked ImmunoSorbent Assay) method.

The most preferred test item to which the generating method of the present disclosure is applied is the expression level of CK19 mRNA that measures cancer metastasis to lymphatic tissue.

A method of generating the determination result will be described in the section of a sample analyzer described later.

The ratio of the sample determined to be positive or negative by the plurality of sample analyzers from a plurality of determination results acquired from the plurality of sample analyzers is, for example, the ratio at which the lesion was determined as positive from the determination results obtained from a plurality of sample analyzers and/or the ratio at which the lesion was determined as negative. The plurality of sample analyzers also may be installed in the same facility or in different facilities.

The ratio is, for example, a positive rate and/or a negative rate. Therefore, the specific number of the plurality of sample analyzers is not limited insofar as the ratio can be obtained, and is at least two. Preferably, the plurality is 5 or more, 10 or more, 20 or more, 50 or more, or 100 or more.

For example, all the determination results acquired by the generating apparatus 3000 may be used as a statistical population to calculate the ratio. For example, the ratio may be calculated for each population using a predetermined group as a statistical population. The predetermined group may be at least one group selected from the groups including the reagent lot, a predetermined number of samples, each sample analyzer, each facility in which the sample analyzer is installed, each apparatus model, each country, prefecture, or region, and a person in charge of an examination. When the ratio is calculated for each reagent lot, the present embodiment can include a step of acquiring information on a reagent lot from the sample analyzer 2000.

The ratio of the sample determined to be positive or negative by the sample analyzer to be managed for analysis accuracy is used as quality control information together with the above index. The quality control information is generated as quality control data comparable to the ratio and the index.

The index is not limited insofar as it is a value that can be precision controlled using the ratio. It is preferable that the index is a value calculated by statistical processing from a plurality of determination results. More preferably, it is a value calculated by statistical processing from a plurality of determination results collected before measurement of the sample. It is preferable that the index has already been calculated when the ratio is calculated. The index may vary depending on the number of cumulative samples up to the point of generating the index. The index may be updated, for example, when the reagent lot or the like is changed. The index also may be updated when the treatment method of the subject is changed. The plurality of determination results also may originate from the same facility or from a plurality of facilities. For example, at least one selected from the upper limit value and the lower limit value of the confidence interval can be cited as an index. A value obtained by considering the average value, the standard deviation, the variance and the like of the ratio in the statistical population also may be used as an index. For example, the index may be an average value of the ratios acquired from the plurality of sample analyzers by the time of generating the index. Preferably, both the upper limit value and the lower limit value of the confidence interval can be used as indices. As a confidence interval, preferably 99.7% confidence interval, 99% confidence interval, 95.4% confidence interval, 95% confidence interval, or 68.3% confidence interval can be used. More preferably it is a 99.7% confidence interval. For example, when adopting a 99.7% confidence interval, the upper limit value is ((average value of ratio in population)+ (3× standard deviation of ratio in population), and the lower limit value is (average value of the ratio in the population)− (standard deviation of the ratio in the 3× population). Methods of calculating the confidence interval are well-known.

The estimation formula of the range of the population ratio (confidence interval) is, for example, as follows.

$$\frac{n}{n+Z^2}\left(p + \frac{Z^2}{2n} \pm Z\sqrt{\frac{p(1-p)}{n} + \frac{Z^2}{4n^2}}\right) \qquad \text{Function 1}$$

(In the formula, n represents the number of samples after the reagent lot was changed, p represents the average value of the cumulative samples, and Z represents a constant).

The index can be determined in advance by using a plurality of determination results previously acquired by the generating apparatus 3000. The specific number of the plurality of determination results is not limited insofar as a reliable value can be acquired.

Showing the ratio together with the index is not limited insofar as the ratio and the index are displayed together on one screen or on one sheet, for example, and at least temporarily both can be viewed at the same time. For example, the ratio and the value of the index may be shown side by side; the value of the ratio may be shown as a scattergram or graph, and the index may be shown as a border line and the like.

The ratio may constitute information of one quality control in a state that can be indicated together with the index.

For example, the ratio may be calculated for each test item with respect to a plurality of test items. In this case, each ratio can be indicated as quality control information together with an index corresponding to each ratio.

The quality control information may be output to the output unit 720 such as a screen, a printer or the like as the quality control data 4050 which are user interface data. When the quality control data 4050 are displayed on a screen or the like, it is displayed via browser software or the like.

It is preferable that the sample analyzer 2000 transmits the determination result 4010 to the generating apparatus 3000 and/or the server 4000 within a predetermined time (preferably within 5 minutes) after obtaining the determination result 4010. It also is preferable that the operator or the generating apparatus 3000 acquires the determination result 4010 from the sample analyzer 2000 or the server 4000 at predetermined intervals (preferably every 5 minutes). It is preferable that the acquired data and the ratio calculated from a plurality of determination results are included in time series information on each quality control. It also is preferable that the quality control data 4050 is also generated in real time every time the determination result 4010 is acquired. In this way the operator can know the occurrence of a quality control abnormality in a short time from the occurrence of the abnormality.

The quality control data also may include other quality control information. Other information on quality control includes at least one selected from the group consisting of, for example, calibration data 4020, control data 4030 including positive control data and/or negative control data, and operational data 4040 (for example, time series) and the like. More preferably, when the test item is an item for measuring the expression level of mRNA, other information on quality control includes rise time of turbidity in positive control, quantitative data (copy number) of positive control, and slope of the calibration curve.

The operational data 4040 are data obtained by monitoring the operation of the sample analyzer during sample measurement. The operational data 4040 include at least one kind of data selected from the group of capacitance, quantitative count (liquid volume), suction and discharge pressure of reagent, ambient temperature, remaining amount of reagent, error code, error content, error occurrence date and time, operation monitor, and status.

2. Quality Control Method

One embodiment of the present disclosure relates to a quality control method for managing the analytical accuracy of a sample analyzer including a step of evaluating the analysis accuracy of a sample analyzer to be managed based on an index generated by the generating method described in section 1 above.

In the present embodiment, when the ratio obtained from the sample analyzer to be managed deviates from the range indicated by the index, it is determined that the analysis accuracy has decreased. Alternatively, when the ratio is within the range indicated by the index, it is determined that the analysis accuracy is maintained. When it is determined that the analysis accuracy has deteriorated, a warning or the like may be issued. The warning may be issued to the operator or may be issued to the user operating the sample analyzer 2000. The warning also may be output to the output unit 720 of the generating apparatus 3000. For example, a mark indicating a warning may be displayed on the screen. The mark indicating a warning may be displayed in accordance with the display area of the quality control information for which the warning is issued.

Figure 3:
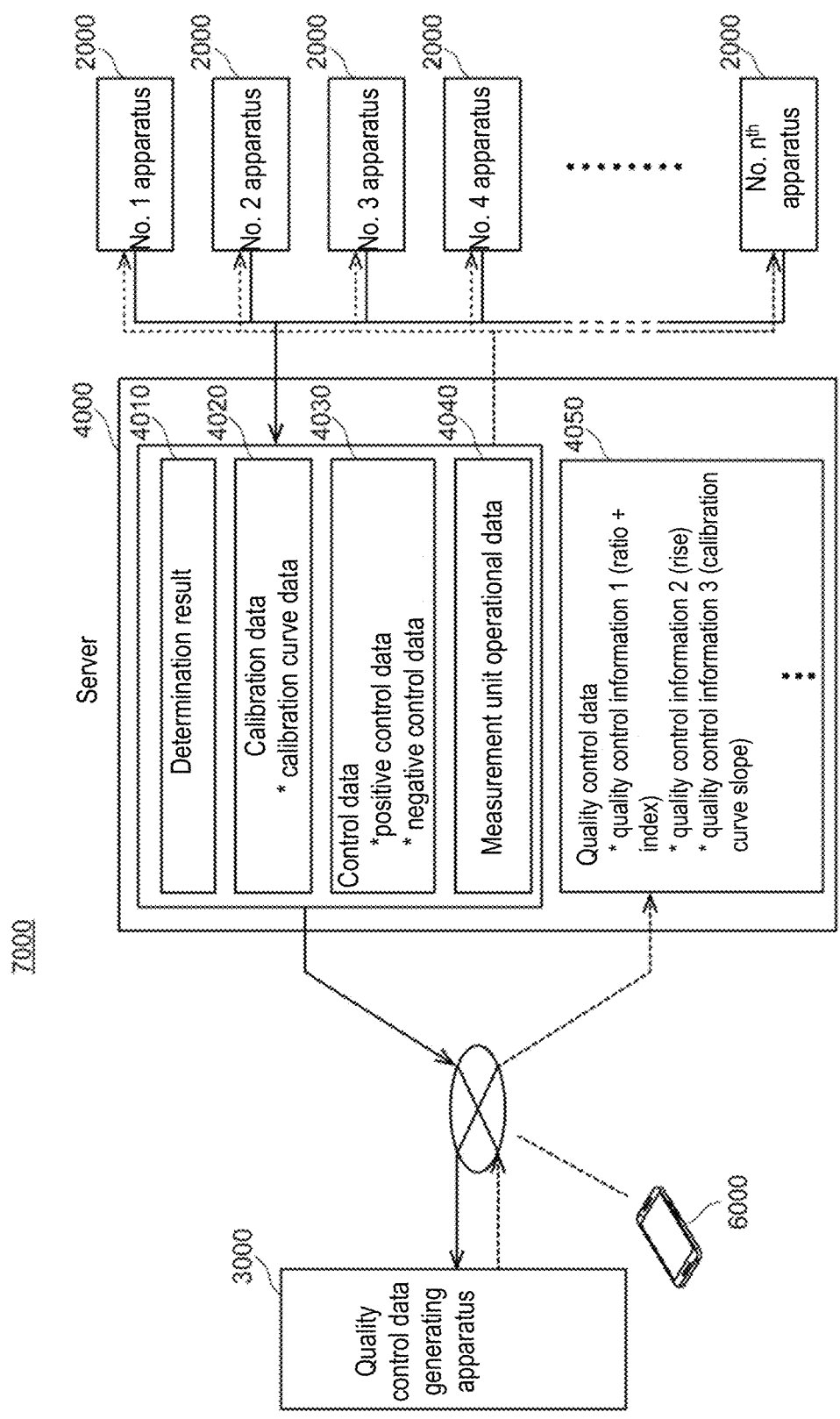
FIG. 3 is a block diagram showing an example of a configuration of a system for generating quality control data.

3. System for Generating Quality Control Data and Method for Constructing Same 3-1. System Structure FIG. 3 is a schematic diagram showing an example of the structure of a quality control data generation system 7000 (hereinafter also simply referred to as "generation system 7000") according to the third embodiment. The generation system 7000 includes an index generating apparatus 3000 for managing the analysis accuracy of the sample analyzer and a sample analyzer 2000 installed at a user facility such as a hospital or an examination center. The generating apparatus 3000 is connected via a communication network such as the Internet or a dedicated line so as to be capable of communicating data. In the present disclosure, being connected in a communicable manner includes a case where the generating apparatus 3000 and the sample analyzer 2000 are directly connected, and a case where the generating apparatus 3000 and the sample analyzer 2000 are indirectly connected via the server 4000 or the like. The generation system 7000 also may include a portable terminal 6000 such as a tablet or the like. The portable terminal 6000 can browse the quality control data 4050 and the like. The sample analyzer 2000 and the generating apparatus 3000 are described above. In the generation system 7000, the sample analyzer 2000 and the generating apparatus 3000 may be installed in the same facility or may be installed in different facilities.

3-2. System Construction Method

The fourth embodiment relates to a method of constructing a system for generating quality control data for managing analysis accuracy of a sample analyzer including a step of preparing a generating apparatus 3000 and a step of preparing a sample analyzer 2000. This embodiment also may include a step of preparing the server 4000. The present embodiment also may include a step of communicably connecting the generating apparatus 3000 and the sample analyzer 2000.

3-3. Configuration of Sample Analyzer

The sample analyzer 2000 according to the present embodiment may be a gene amplification detection apparatus that measures the presence or absence of a specific DNA sequence and the expression level of mRNA by a nucleic acid detection method, an immunological measuring device for conducting qualitative or quantitative determination of proteins or the like by an immunological technique, a biochemical measuring apparatus for detecting an enzyme activity or an amount of a compound by a biochemical measurement method, a blood cell counter for counting the number of blood cells in a blood sample, a blood coagulation measuring apparatus for evaluating blood clotting ability, a urine qualitative analyzer for detecting an enzyme activity in a urine specimen or an amount of a compound, a urinary solid component analysis apparatus for detecting a solid component in a urine sample and the like.

Preferably, the sample analyzer 2000 is configured to analyze tumors. More preferably, the sample analyzer 2000 analyzes cancer metastasis.

Figure 4:
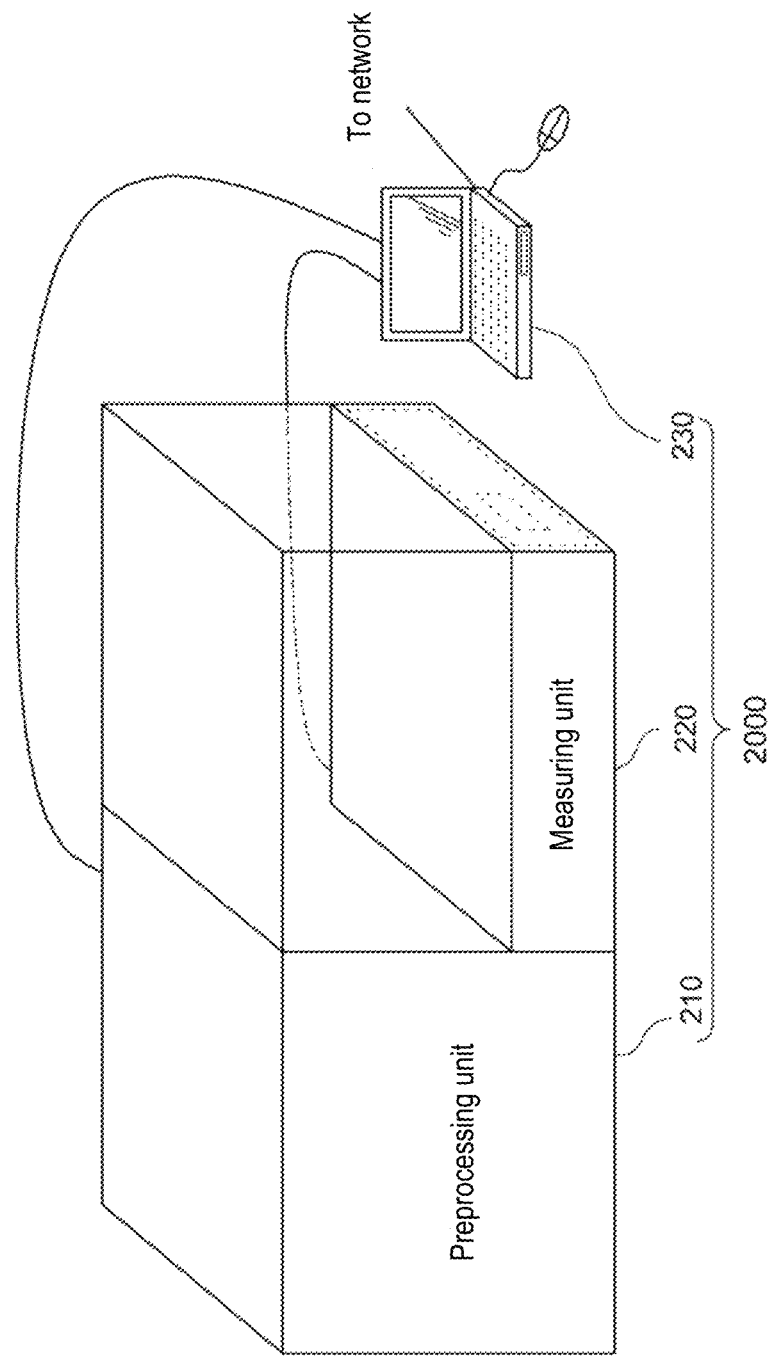
FIG. 4 is a schematic diagram showing an example of a configuration of a system for generating quality control data.

FIG. 4 shows an example of a configuration of a gene amplification detection apparatus as an example of the sample analyzer 2000. The sample analyzer 2000 is capable of outputting as the measurement data the presence or amount of a target nucleic acid (target gene) contained in a sample, that is, excised tissue or the like from the subject, as the measurement data. More specifically, the sample analyzer 2000 is preferably used as a genetic diagnostic system for cancer lymph node metastasis to detect and quantify a target nucleic acid (cancer gene; mRNA) by performing pretreatment (such as homogenization, extraction treatment) of lymph nodes (samples) excised from a human body, preparing a solubilized extract solution as a measurement sample for nucleic acid detection, amplifying the target nucleic acid (target gene) present in the measurement sample by the LAMP method, and measuring the turbidity of the solution generated along with amplification.

The sample analyzer 2000 is used, for example, for intraoperative rapid diagnosis, specifically, it is used for examinations during surgery such as cancer. For example, the sample analyzer 2000 obtains the concentration of a cancer-derived gene (target nucleic acid) in a lymph node from the lymph node excised during surgery, and referring to this, the doctor diagnoses the degree of cancer metastasis during the operation, and determines the extent of excision of the node. Therefore, the output of the sample analyzer 2000 is required to have high reliability and quickness.

As shown in FIG. 2, the sample analyzer 2000 includes a preprocessing unit 210 for preparing a measurement sample by performing pretreatment such as homogenization on a sample obtained from a human body or the like, and a measurement unit 220 for performing detection processing of the target nucleic acid. The sample analyzer 2 has a data processing unit 230 for performing data processing, data communication, or the like. The data processing unit 230 also has a function as a control device that receives measurement data from both the preprocessing unit 210 and the measurement unit 220, and transmits operation instruction signals and the like to the preprocessing unit 210 and the measurement unit 220. That is, the preprocessing unit 210 and the data processing unit 230 function as a preprocessing device, and the measuring unit 220 and the data processing unit 230 function as a nucleic acid detecting device. The data processing unit 230 is connected to a network, and the data processing unit 230 can send the measurement data transmitted from the sending unit of each of the preprocessing unit 210 or the measurement unit 220 to the generating apparatus 3000 by the data transmission/reception function with the generating apparatus 3000 or the server 4000 described above.

Figure 5:
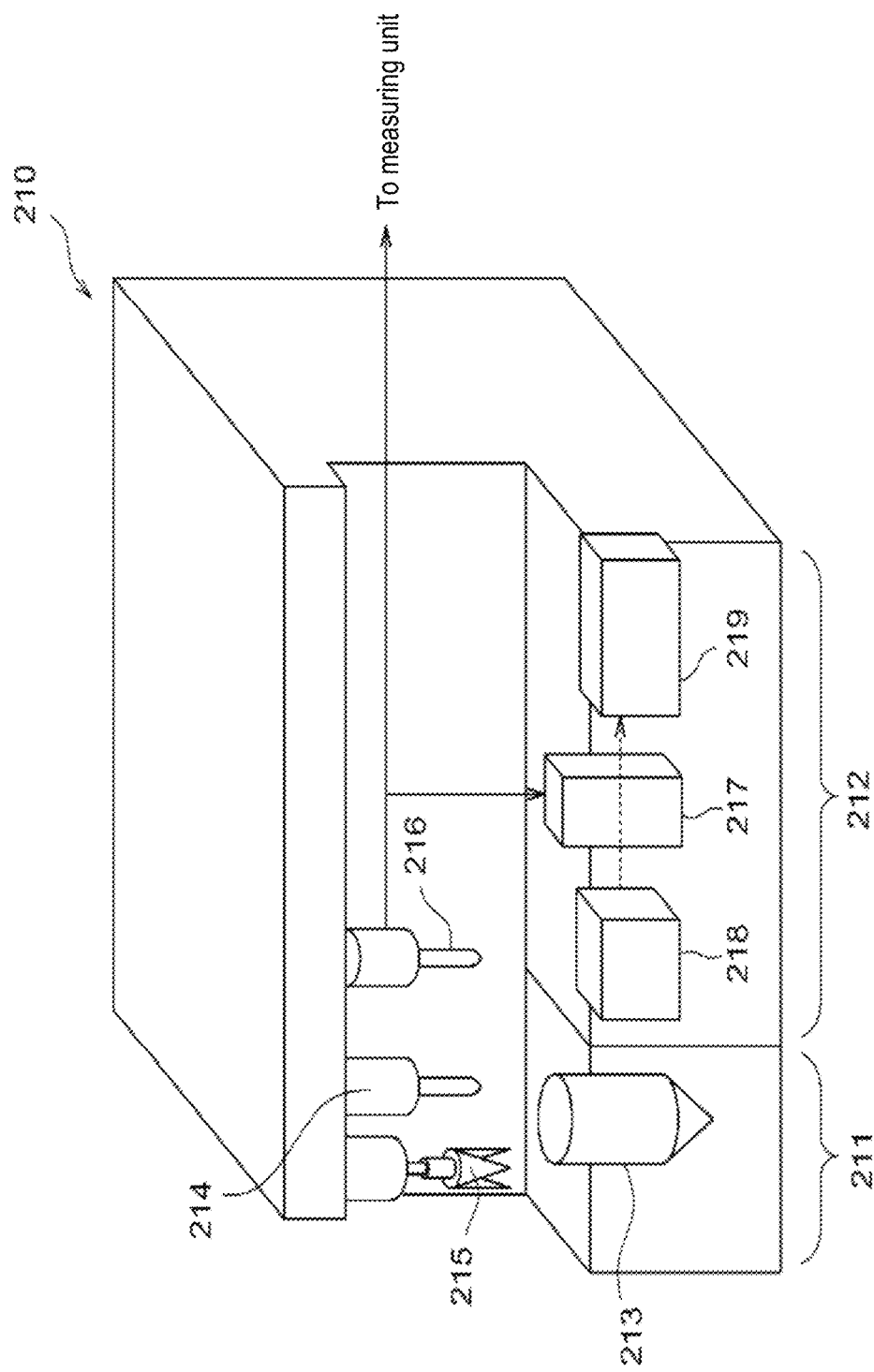
FIG. 5 is a schematic diagram showing an example of a preprocessing unit.

FIG. 5 is a schematic diagram showing an example of the structure of the preprocessing unit 210. As shown in FIG. 5, the preprocessing unit 210 mainly includes a preprocessing section 211 which performs preprocessing on a sample to obtains a measurement sample, a measuring section 212 which measures the preprocessed measurement sample. The preprocessing section 211 includes a sample setting unit 213 for setting a container containing a sample, a reagent adding unit (reagent dispensing pipette) 214 for adding a preprocessing reagent to a sample container set in the sample setting unit 213, a blender (homogenizing unit) 215 for homogenizing the sample, a pipette (dispensing unit) 216 for dispensing the homogenized (preprocessed) measurement sample, and a transfer section (not shown) for transferring the pipette 216 to the measuring section 212 and the measuring unit 220.

Upon receiving a measurement start instruction signal from the data processing unit 230, the preprocessing unit 210 adds a preprocessing reagent to the sample of the sample setting unit 213 (preprocessing reagent addition process), and homogenizes the sample by the blender 215 to obtain a measurement sample (homogenization process). Then, the measurement sample is suctioned by the pipette 216, and in the case of normal nucleic acid detection, the pipette 216 moves to the measuring unit 220, and the sample is discharged into the sample container 22 set in the measuring unit 220.

On the other hand, in the case of quality control, the pipette 216 that has suctioned the measurement quality control sample prepared by preprocessing the preprocess quality control sample for pretreatment moves to the light absorbance measuring cell 217, and the measurement quality control sample is discharged to the light absorbance measurement cell 217 of the measuring unit 212. Light is irradiated from the light source 218 on the light absorbance measuring cell 217, the light is detected by a detector (light receiving unit) 219, and the absorbance of the preprocessed measurement sample is measured. The measured absorbance (measured data) is sent by a transmitter (not shown) of the preprocessing unit 210 to the data processing unit 230. Note that the preprocessing is not limited to homogenization and also may be nucleic acid extraction processing or the like.

Figure 6:
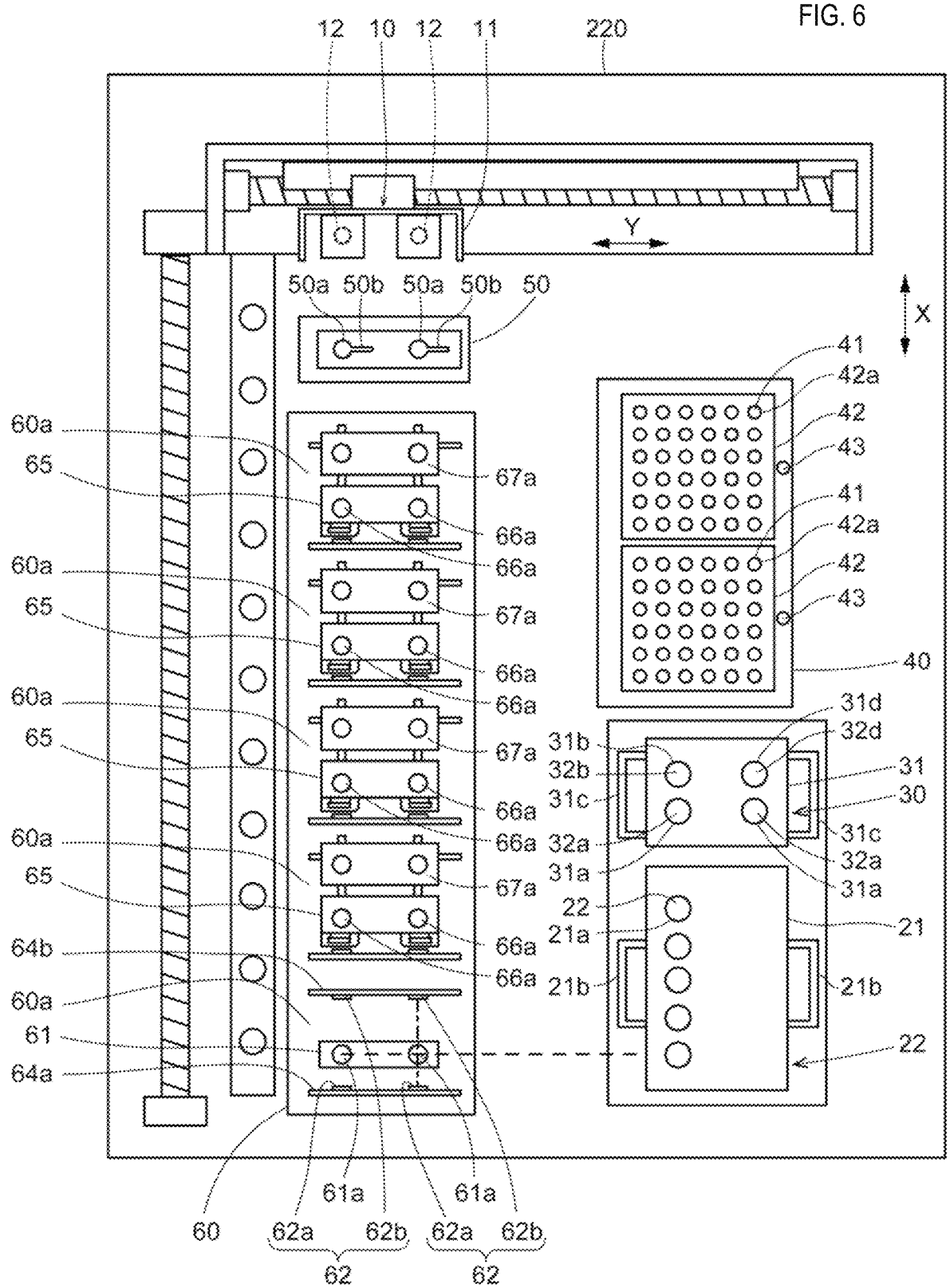
FIG. 6 is a plan view showing an example of a configuration of a measuring unit.

FIG. 6 is a plan view showing an example of the structure of the measurement unit 220. The measuring unit 220 is configured as shown in FIG. 6, and details of this apparatus are described in Japanese Patent Application Publication No. 2005-98960. Here, the structure, operation and the like of the measuring unit 220 will be briefly described. First, the pipette moved from the preprocessing unit 210 discharges the preprocessed sample into the sample container 22 set in the sample container 22 set in the sample container setting hole 21a of the sample container base 21.

A primer reagent container 32a containing a primer reagent of a target nucleic acid, for example, CK 19 (cytokeratin 19), and an enzyme reagent container 32b containing an enzyme reagent are placed in the primer reagent container setting hole 31a and the enzyme reagent container setting hole 31b on the front left side of the reagent container setting unit 30. A primer reagent container 32a containing primer reagent of an internal standard substance *Arabidopsis* (*Arabidopsis* is hereinafter referred to as "arabido") is set in the primer reagent container setting hole 31a on the front right side of the reagent container setting unit 30. Arabido solution container 32d containing a predetermined amount of arabido is set in the arabido container setting hole 31d on the front right side.

Two racks 42 each containing 36 disposable pipette tips 41 are fitted in recesses (not shown) of the tip setting unit 40. Two cell units 66a of the detection cell 65 are set in the two detection cell set holes of the reaction unit 61 of each reaction detection block 60a.

In this state, when the operation of the measuring unit 220 starts and after the arm 11 of the dispensing mechanism 10 is moved from the initial position to the tip setting unit 40, two syringe units 12 of the the dispensing mechanism 10 are moved downward in the tip setting unit 40. In this way the tip ends of the nozzles of the two syringe unit 12 are press-fitted into the upper opening of the two pipette tips 41, so that the pipette tips 41 are automatically attached to the tip ends of the nozzles of the two syringe units 12. Then, after the two syringe units 12 are moved upward, the arm 11 of the dispensing mechanism 10 is moved in the X axis direction above the two primer reagent containers 32a containing arabido primer reagent and a target nucleic acid set in the reagent container setting base 31. When the two syringe units 12 are moved in the downward direction, the tips of the two pipette tips 41 attached to the nozzles of the two syringe units 12 are respectively inserted in the liquid surface of the arabido and target nucleic acid printers in the two primer reagent containers 32a. Then, the primer reagents of CK19 and arabido in the two primer reagent containers 32a are suctioned by the pump section of the syringe unit 12.

After the suction of the primer reagents, and after the two syringe units 12 are moved upward, the arm 11 of the dispensing mechanism 10 moves above the reaction detection block 60a positioned on the innermost side (the front side of the apparatus). In this case, the arm 11 of the dispensing mechanism 10 is moved so as not to pass above the other second to fifth reaction detection blocks 60a from the inner side. Then, in the reaction detection block 60a on the innermost side, the two syringe units 12 are moved in the downward direction so that the two pipette tips 41 attached to the nozzles 12a of the two syringe units 12 are inserted into the two cell units 66a of the cell 65. Then, using the pump portions of the syringe unit 12, the two primer reagents CK19 and arabido are respectively discharged into two cell units 66a (primer reagent dispensing process).

Thereafter, the pipette tips 41 are discarded, and two new pipette tips 41 are automatically attached to the tips of the nozzles of the two syringe units 12, and in substantially the same operation as above, the enzyme reagent is discharged into the two cell units 66a of the detection cell 65 (enzyme reagent dispensing process). Thereafter, in a similar manner, the arabido solution in the arabido solution container 32d is discharged to the two cell units 66a of the detection cell 65. Then, similarly, the sample (measurement sample) of the sample container 22 is discharged to the two cell units 66a of the detection cell 65 (sample dispensation process). In this way the sample for detecting the target nucleic acid is adjusted in one cell unit 66a of the detection cell 65, and the sample for detecting arabido is adjusted in the other cell unit 66a.

The lid closing operation of the detection cell 65 is performed after the primer reagent, the enzyme reagent, the arabido solution and the sample are discharged into the cell unit. After the lid closing operation is completed, the liquid temperature in the detection cell 65 is heated from about 20° C. to about 65° C. by using the Peltier module of the reaction unit 61, whereby the target gene (CK 19) and arabido are amplified by the LAMP method. Then, white turbidity due to magnesium pyrophosphate produced along with amplification is detected by a turbidimetric method. Specifically, light having a diameter of about 1 mm is emitted from the LED light source unit 62a of the turbidity detection unit 62 on the cell unit 66a of the detection cell 65 during the amplification reaction via the light irradiation groove of the reaction unit 61. Then, the irradiated light is received by the photodiode light receiving unit 62b. In this way liquid turbidity in the cell unit 66a of the detection cell 65 during the amplification reaction is detected (monitored) in real time. Measurement data of measured CK19 and measurement data of measured arabido measured by the photodiode light receiving unit 62b are transmitted to the data processing unit 230 by a sending unit (not shown) of the measurement unit 220.

Figure 7:
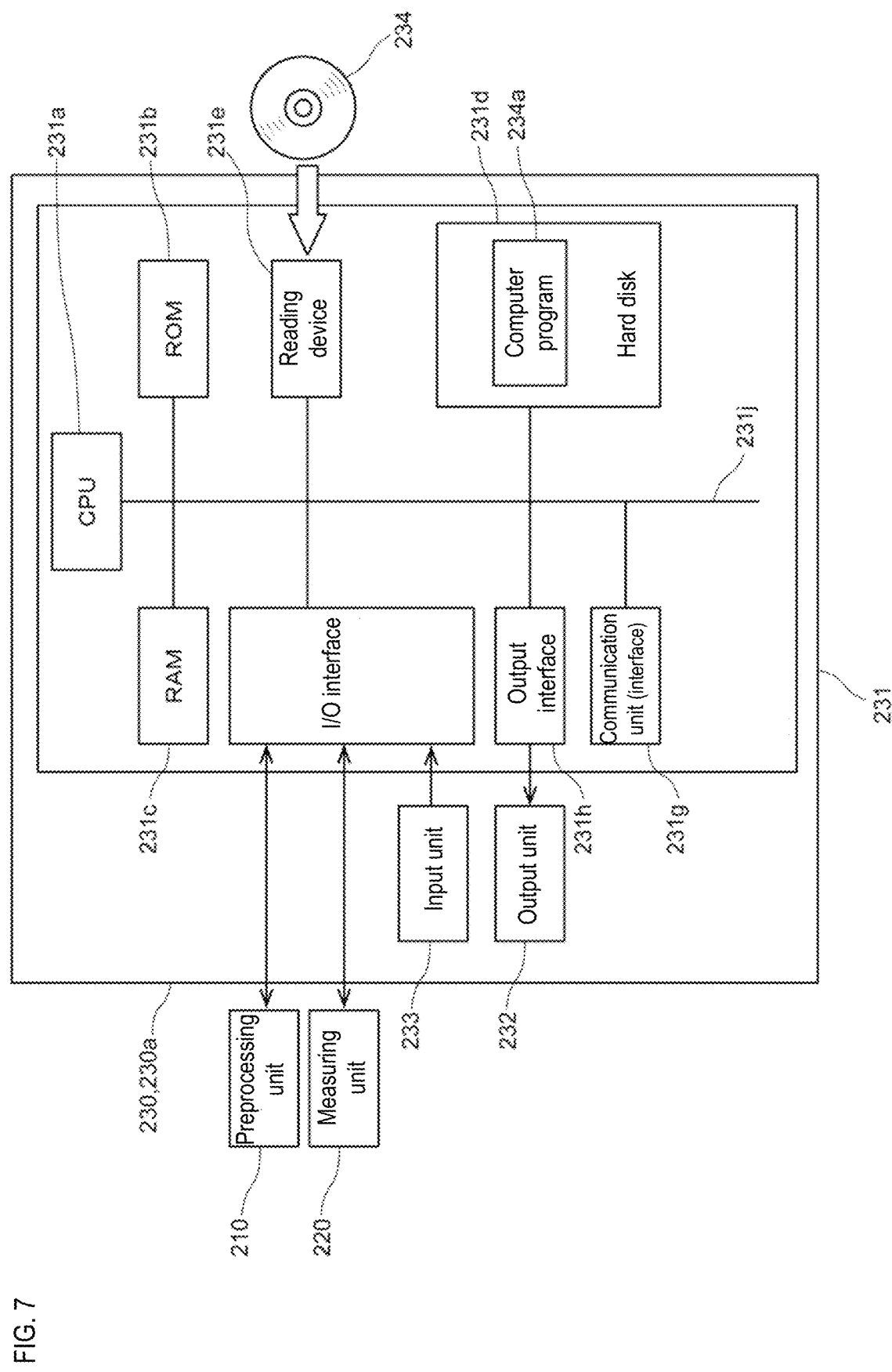
FIG. 7 is a block diagram showing an example of a hardware structure of a data processing unit.

Next, the structure of the data processing unit 230 will be described. FIG. 7 is a block diagram showing a structure of the data processing unit 230. The data processing unit 230 is realized by the computer 230a. As shown in FIG. 7, the computer 230a includes a main body 231, an output unit 232, and an input unit 233. The main body 231 includes a processing unit 231a (CPU: Central Processing Unit, GPU: Graphics Processing Unit or MPU: Micro Processing Unit), ROM (read-only memory) 231b, main storage unit (RAM: random access memory) 231c, auxiliary storage unit (hard disk) 231d, a reading device 231e, an input/output (I/O) interface 231f, a communication interface 231g, and an output interface 231h, wherein the processing unit 231a, ROM 231b, main storage unit 231c, auxiliary storage unit 231d, reading device 231e, I/O interface 231f, the communication interface 231g, and the output interface 231h are connected by a bus 231j. The main storage unit 231c and the auxiliary storage unit 231d are collectively referred to as a storage unit.

The reading device 231e can read a computer program 234a for causing the computer to function as the information processing unit 230 from a portable recording medium 234, and install the computer program 234a in the hard disk 231d.

The preprocessing unit 210, and the measuring unit 220 are respectively connected via cables to the input/output interface 231f. The input/output interface 231f is connected to the preprocessing unit 210 and the measuring unit 220 so so as to allow communication of data and the output of control signals to the preprocessing unit 210 and the measuring unit 220. A control unit (not shown) of the preprocessing unit 210 and the measuring unit 220 which received the control signal decodes the control signal and drives the actuators of the respective mechanisms in accordance with the control signal. Measurement data can be transmitted from the preprocessing unit 210 and the measuring unit 220 to the data processing unit 230, and the CPU 231a performs predetermined processing when the data processing unit 230 receives the measurement data.

Figure 8:
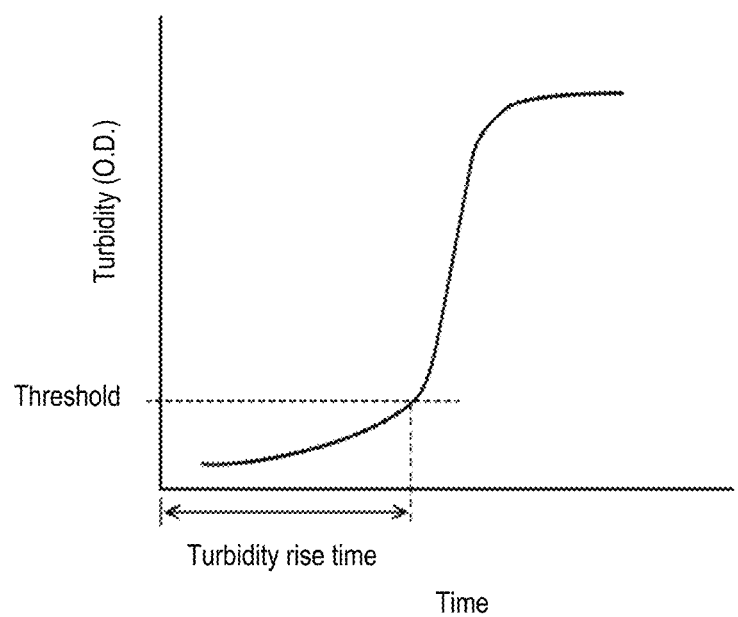
FIG. 8 is a graph showing an example of rise time of turbidity.
Figure 9:
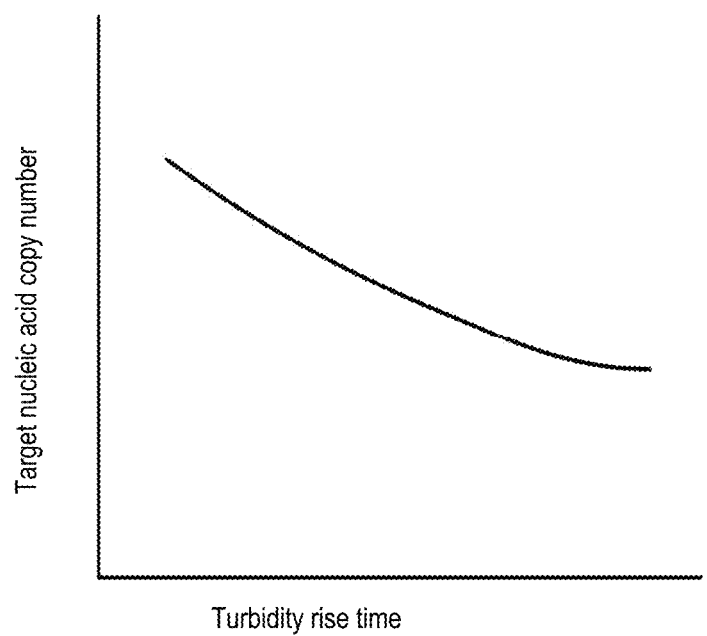
FIG. 9 is an example of a calibration curve.

The processing by the processing unit 231a of the measurement data acquired by the measuring unit 220 will be described in more detail. As described above, the measurement data of the target nucleic acid and the measurement data of the arabido measured by the photodiode light receiving unit 62b are transmitted from the measuring unit 220. When the horizontal axis represents time and the vertical axis represents turbidity (OD: Optical Density), measurement data of the target nucleic acid as shown in FIG. 8 are obtained in the processing unit 231a. Then, from the measurement data of the target nucleic acid, the processing unit 231a detects the amplification rise time which is the time until the copy number of the target gene (for example, CK19) in the sample sharply increases. On the other hand, the processing unit 231a creates measurement data of arabido in which time is plotted on the horizontal axis and turbidity is plotted on the vertical axis based on arabido measurement data, and and obtains the arabido amplification rise time based on the measurement data. The processing unit 231a corrects the amplification rise time of the target nucleic acid based on the amplification rise time of arabido. By making such correction, it is possible to eliminate the influence of the amplification inhibiting substance in the sample on the measurement result. Then, based on the calibration curve prepared from the measurement data of the calibrator shown in FIG. 9, the expression amount of the target gene, that is, the quantitative data (copy number) of the target nucleic acid is calculated from the amplification rise time of the corrected target nucleic acid. Here, the calibration curve shown in FIG. 9 is a curve obtained by taking the amplification rise time on the horizontal axis and the copy number of the target nucleic acid [copy number/µL] on the vertical axis; and in general, the concentration increases with a shorter the amplification rise time.

The data processing unit 230 also may be capable of receiving the quality control data 4050 transmitted from the generating apparatus 3000, which will be described later, directly or via the server 4000. The processing unit 231a also may receive the quality control data 4050 via the communication unit 231g, and display the quality control data 4050 on the output unit 231h.

3-4. Server

The fifth embodiment relates to a server 4000. The server 4000 is realized by a computer. Since the structure of the computer that realizes the server 4000 is the same as the structure of the computer 710 that implements the generating apparatus 3000, its description will be omitted.

As shown in FIG. 3, the auxiliary storage unit (hard disk) of the computer configuring the server 4000 includes a calibrator-control database 4100 for storing status information on the state of the sample analyzer 2000, a determination result database 4010DB, a sample processing apparatus operation database 4040, and a quality control information database 4050DB.

FIG. 10 is a schematic diagram showing an example of the calibrator-control database 4100. In the calibrator-control database 4100, for example, has a field F1 for storing the number (acceptance number) of the accepted data, a field F2 for storing data reception date, a field F3 for storing data reception time, a field F4 for storing the model code of the sample analyzer, a field F5 for storing a device ID individually assigned to each sample analyzer, a field F6 for storing an operation status code indicating the state of the apparatus or an error code indicating the type of abnormality of the apparatus, field F7 for storing the name of the operator who performed the data updating process, a field F8 for storing a data processing section, a field F9 for storing information on the reagent lot (lot number and the like of the reagent), a field F10 for storing the copy number of the positive control and the rise time of the turbidity, a field F11 for storing the copy number of the negative control and the rise time of the turbidity, a field F12 for storing the copy number of the first calibrator and the rise time of the turbidity, a field F13 for storing the copy number of the second calibrator and the rise time of the turbidity, a field F14 for storing the copy number of the third calibrator and the rise time of the turbidity, and a field F15 for storing the slope of the calibration curve created from the three calibrators. Fields F10 to F14 store data for each test item.

FIG. 11 is a schematic diagram showing an example of the determination result database 4010DB. In the determination result database 4010DB, for example, a field F21 for storing a receiving number, a field F22 for storing the data reception date, a field F23 for storing data reception time, a field F24 for storing the model code of the sample analyzer, a field F25 for storing an apparatus ID individually assigned to each sample analyzer, a field F26 for storing an identification number (ID) of each sample, and a field F26 for storing the determination result of each sample for each test item are provided.

FIG. 12 is a schematic diagram showing an example of the sample processing apparatus operation database 4040. In the sample processing apparatus operation database 4040, for example, a field F31 for storing a receiving number, a field F32 for storing the data reception date, a field F33 for storing the data reception time, a field F34 for storing a model code of the sample analysis apparatus, a field F35 for storing the apparatus ID individually assigned to each sample analyzer, a field F36 for storing the electrostatic capacity of the pipette, a field F37 for storing the pipette quantitative count, a field F38 for storing the pipette suction and discharge pressures of the reagent, a field F39 for storing the environmental temperature of the block, a field F40 for storing the remaining amount of the reagent and the like are provided.

FIG. 13 is a schematic diagram showing an example of the quality control database 4050DB. In the quality control database 4050DB, for example, a field F41 for storing the receiving number, a field F42 for storing the data reception date, a field F43 for storing the data reception time, a field F44 for storing the model code of the sample analyzer, a field F45 for storing an apparatus ID individually assigned to each sample analyzer, and a field F46 for storing the ratio indicating the degree to which the lesion is positive in the plurality of samples calculated by the generating apparatus 3000 are provided.

Although the embodiment described above description provides a field for storing a receiving number, a field for storing data reception date, a field for storing data reception time, a field for storing a model code of the sample analyzer, and a field for storing the apparatus ID allocated individually to the respective sample analyzers, the information common to each database also may be provided in a separate list and the list and the data in each database may be stored, for example, in association with a receiving number or the like.

A server program such as a server operating system (OS) such as Linux (registered trademark), UNIX (registered trademark), Microsoft Windows Server (registered trademark) and the like is installed in the auxiliary storage unit of the computer, and the computer executes the database server program so that the computer functions as the server 4000. The determination result 4010, the calibration data 4020, the control data 4030, and the operational data 4050 of the sample processing apparatus 2000 transmitted from the sample analyzer 2000, are stored, for example, in the auxiliary storage unit of the server via the communication unit of the server.

3-5. Quality Control Index Generating Apparatus

Figure 14:
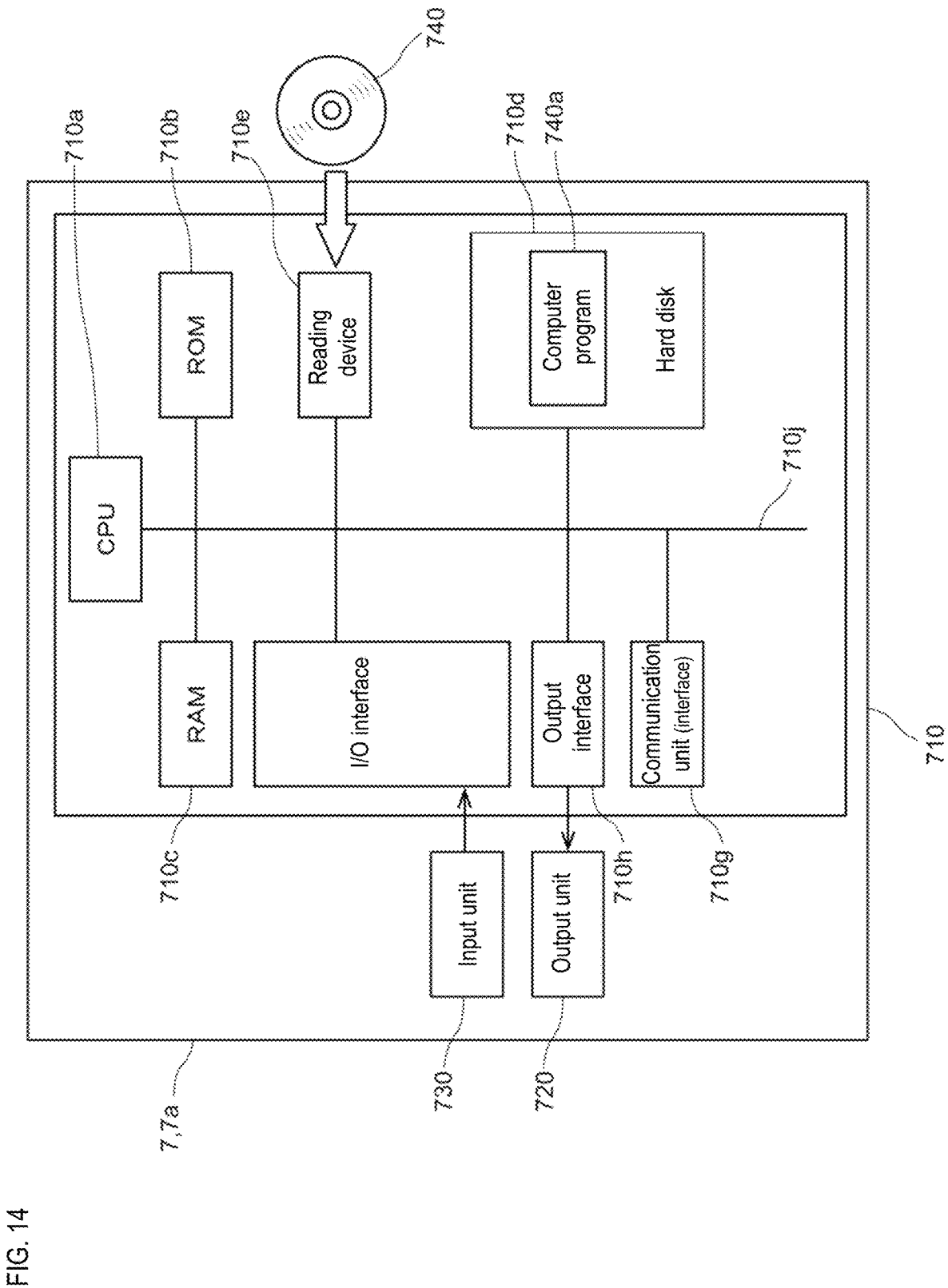
FIG. 14 is a block diagram showing an example of a hardware structure of an apparatus for generating a quality control index.

FIG. 14 is a block diagram showing an example of the structure of the generating apparatus 3000. The generating apparatus 3000 is realized by the computer 7a. As shown in FIG. 14, the generating apparatus 3000 includes a main body 710, an output unit 720 such as a screen, a printer, and the like, and an input unit 730 such as a keyboard or a touch panel. The main body 710 includes a processing unit (CPU, GPU or MPU) 710a, a ROM 710b, a main storage unit (RAM) 710c, an auxiliary storage unit (hard disk) 710d, a reading device 710e, an input/output interface 710f, a communication unit (communication interface) 710g, and an output interface 710h, and the processing unit 710a, ROM 710b, auxiliary storage unit 710c, hard disk 710d, reading device 710e, input/output interface 710f, communication unit 710g, and output interface 710h are connected by a bus 710j.

The reading device 710e can read the computer program 740a for causing the computer to function as the generating apparatus 3000 from a portable recording medium 740, and install the computer program 740a in the auxiliary storage unit 710d.

An electronic mail program also may be installed in the auxiliary storage unit 710d. By executing the e-mail program, the generating apparatus 3000 functions as a client of the e-mail system and can send e-mail.

A web browser program also may be installed in the auxiliary storage unit 710d. By executing such a web browser program by the processing unit 710a, the generating apparatus 3000 functions as a web client, and the various data acquired from the server 4000 and the quality control data 4050 generated by the processing unit 710a can be displayed as a window on the output unit 720.

The server 4000 also may be integrated with the generating apparatus 3000. In this case, the respective databases described in section 3-4 above are stored in the auxiliary storage unit 710c of the generating apparatus 3000.

3-6. Operation of Sample Analyzer

An example of the operation of the sample analyzer 2000 will be described with reference to FIG. 15. Here, an explanation will be given by using an example in which each database described in 3-4 above is stored in the server 4000, and, as described in 3-5 above, the server 4000 also may be integrated with the generating apparatus 3000.

The sample analyzer 2000 is started before the inspection starts (step S101). The activation process is executed as follows. A power button (not shown) is provided in the measuring unit 220 of the sample analyzer 2000, and the power source of the measuring unit 220 is turned on when the power button is pressed by the user. When the power supply is turned on, the measurement unit 220 executes the origin adjustment and the operation confirmation of the mechanical parts, shifts to the standby state, and the activation process is completed. When the processing unit 231a of the data processing unit 230 detects that the measuring unit 220 has shifted to the standby state, the processing unit 231a of the data processing unit 230 generates communication data for notifying that the sample analyzer 2000 has been activated, and transmits the communication data to the server 4000 via the communication unit 231g (step S102). The communication data include a model code of the sample analyzer, an apparatus ID of the sample analyzer, and an operational status code of the sample analyzer.

The model code and the serial number of the sample analyzer 2000 are stored in the hard disk 231d of the data processing unit 230. The operational state code is set to "0" when the state of the sample analyzer is activated (activation state), set to "1" to start measurement of the calibrator to create a calibration curve (calibration curve measurement start state), set to "2" for the state in which the calibrator measurement was completed for preparation (calibration curve measurement end state), set to "3" for the state in which the created calibration curve was approved by the user ("calibration curve validation state"), set to "4" for the measurement of the sample, set to "5" for the state in which the measurement of the sample is completed (sample measurement end state), and set to "6" for the state in which the sample analyzer (measurement unit) is shut down (measurement unit end state). The processing unit 231a of the data processing unit 230 generates communication data associating the model code and serial number stored in the auxiliary storage unit 231d and the operation state code corresponding to the device state at that time ("0" in this case). The communication data also may include operational data 4040.

Next, for example, a calibration curve is created to be used for quantification of nucleic acids, proteins, compounds, and the like corresponding to each test item. The preparation of the calibration curve is carried out by measurement of the calibrator by the measuring unit 220. The calibrator includes, for example, a predetermined amount of a standard substance of a test item. In preparing the calibration curve, it is preferable to use two or three types of calibrators having different amounts of standard substances. Hereinafter, the processing by the processing unit 231a will be described taking as an example the case where the test item is an item for measuring the expression level of mRNA (target nucleic acid).

The sample containers 22 containing the above three calibrators are set by the user on the sample container base 21 of the measuring unit 220 prior to the calibration curve preparation process. Then, in order to start the calibration curve creating process (calibrator measuring process) of the measuring unit 220, the user inputs a start instruction by the input unit 233 of the data processing unit 230. Upon receiving an instruction to start the calibration curve measurement (step S103), the processing unit 231a generates communication data for notification of the start of the calibration curve measurement and transmits the communication data to the server 4000 or the generating apparatus 3000 via the communication unit 231g (step S104). The communication data include an operation state code "1" indicating a calibration curve measurement start state. Thereafter, the sample analyzer 2000 executes measurement by the calibrators (step S105).

The process in step S105 will be specifically described. Upon receiving the measurement start instruction signal, the measuring unit 220 performs, for each of the three calibrators, a primer reagent dispensing process, an enzyme reagent dispensing process, and a calibrator solution dispensing process for dispensing the calibrator of the sample container 22 into one cell unit 66a of the detection cell 65. Thereafter, the measurement unit 220 amplifies the target nucleic acid by LAMP (gene amplification) reaction by controlling the temperature in the detection cell 65 to a temperature necessary for denaturation of the nucleic acid, annealing of the primer, and elongation reaction, and performs detection processing for detecting the turbidity in the cell unit 66a of the detection cell 65 during the amplification reaction by the turbidity detection unit 62.

Then, the measuring unit 220 transmits the optical information (measurement data) reflecting the detected turbidity to the data processing unit 230. Upon receiving the measurement data of each calibrator from the measuring unit 220, the processing unit 231a performs analysis processing of the measurement data. In the analysis process, the turbidity rise time of each calibrator is calculated. Note that the turbidity rise time is calculated as the time until turbidity obtained as measurement data exceeds a predetermined value. The processing unit 231a creates a new calibration curve from the rise time calculated for each calibrator based on the currently stored calibration curve or the turbidity corresponding to the copy number of each calibrator.

After creating the calibration curve, the processing unit 231a generates communication data for notifying the end of the calibration curve measurement, and transmits the communication data to the server 4000 via the communication unit 231g (step S106). The communication data also may include the operation state code "2" indicating the calibration curve measurement end state, the calibration data 4020, and the operation data 4040.

The created calibration curve is displayed on the output unit 232 of the data processing unit 230. The processing unit 231a also may accept authentication (validation) of the calibration curve by a user or the like. The user confirms the calibration curve displayed on the output unit 232, and executes the validation of the calibration curve if there is no abnormality in the calibration curve. Upon receiving the validation of the calibration curve (step S107), the processing unit 231a generates communication data for notifying that the validation of the calibration curve has been executed, and transmits the communication data to the server 4000 via the communication unit 231g (step S108). The communication data include an operation state code "3" indicating a calibration curve validation state, calibration data 4020, and operation data 4040.

The rise time of the turbidity of the calibrators and the measurement data of the calibrators are transmitted from the data processing unit 230 to the server 4000 via the communication unit 231g. In addition to the rise time and the copy number of the calibrator, these measurement data include information such as the device ID of the sample analyzer that measured the calibrator, the lot number of the calibrator, and the measurement date and time.

Next, the user performs preprocessing using a sample. At the time of sample measurement, the tissue and the like are set in the sample setting unit 213 of the preprocessing unit 210. Then, in order for the user to start preprocessing of the sample, the input unit 233 of the data processing unit 230 of the sample analyzer 2000 inputs an instruction to start sample measurement. Upon receiving the instruction to start the sample measurement (step S109), the processing unit 231a generates communication data for notifying the start of sample measurement, and transmits the communication data to the server 4000 (step S110). The communication data include an operation state code "4" indicating a sample measurement start state.

The process of step S109 will be specifically described. Upon receiving a measurement start instruction signal (step S111), the preprocessing unit 210 performs the preprocessing reagent addition process and homogenization process on the sample by the preprocessing unit 211 to prepare a measurement sample. This measurement sample is supplied to the measuring unit 212 of the preprocessing unit 210, and the light absorbance is measured. The measurement data of the absorbance is transmitted to the server 4000 by the processing unit 231a via the communication unit 231g (step S112). The processing unit 231a also may transmit the operation data of the preprocessing unit 210 in the preprocess to the server 4000 in step S110.

Next, the processing unit 231a executes the measurement of the quality control sample (hereinafter also simply referred to as "control") for measuring the sample and controlling the accuracy of the measuring unit 220. Two types of control are used as the control, a positive control (first nucleic acid detection quality control substance) containing a target nucleic acid in a known amount and not containing arabido) which is an internal standard nucleic acid (plant-derived nucleic acid; nucleic acid not possessed by a human body), and an internal control containing a known amount of arabido; negative control) which is an internal standard containing a known amount of arabido and not containing nucleic acid.

The sample container 22 containing the positive control and the sample container 22 containing the arabido control are set on the sample container base 21 of the measuring unit 220.

Upon receiving the measurement start instruction signal, the measuring unit 220 performs a sample dispensing process to dispense the measurement sample prepared from the sample from the block 60a near the dispensing unit 10. One detection cell 65 is provided in one block 60a, and a measurement sample for one sample is allocated to one detection cell 65. Since two cell units 66a are provided in one detection cell 65, one measurement sample can be measured in duplicate by one detection cell 65. Although the same measurement sample may be dispensed into the two cell units 66a, the measurement sample added to one cell unit 66a also may be diluted. In this way it is possible to avoid reaching the limit of amplification, so that so that to achieve more accurate quantification when the target nucleic acid contained in the measurement sample has a high copy number. After dispensing the measurement sample prepared from the sample is complete, a positive control of the sample container 22 is dispensed to one cell unit 66a of the detection cell 65, and a negative control is dispensed to the other cell unit 66a. Subsequently, a primer reagent dispensing process and a reagent dispensing process for dispensing an enzyme reagent are performed on the cell unit 66a into which the measurement sample or control is dispensed. Thereafter, the measuring unit 220 amplifies the target nucleic acid and arabid0 by the LAMP method by controlling the liquid temperature in the detection cell 65 to a temperature suitable for nucleic acid amplification, and the turbidity detection unit 62 detects (monitors) the turbidity in each cell unit 66a of the detection cell 65 in real time (step S113). The result of the detection process is transmitted to the server 4000 via the communication unit 231g by the processing unit 231a (step S114). The processing unit 231a also may transmit the operational data of the measuring unit 220 in the detection processing to the server 4000 in step S113.

When measurement data of the measurement sample, the positive control, and the negative control are detected by the measuring unit 220, the optical information (measurement data) thereof are analyzed by the processing unit 231a. In the analysis process, the amplification rise time of the turbidity, the quantitative value (copy number) of the target nucleic acid or arabido is calculated (step S115). The amplification rise time of turbidity is calculated as the time until the turbidity obtained as optical information exceeds a predetermined value.

The processing unit 231a transmits calculated data of the amount of expression of the target nucleic acid or the amount of expression of arabido to the server 4000 via the communication unit 231g (step S116). The processing unit 231a also displays data of the calculated expression amount of the target nucleic acid on the output unit 232.

Figure 16:
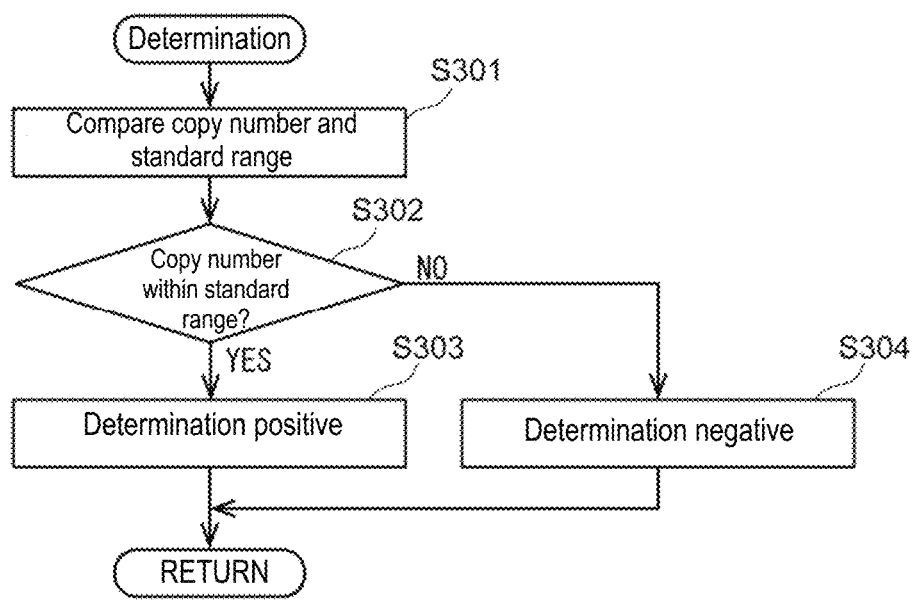
FIG. 16 is a flowchart showing steps of a determination process in the sample analyzer.

Next, the processing unit 231a determines a qualitative determination result 4010 for diagnostic support (that is, whether the lesion reflected by the quantified target nucleic acid is positive or negative) from the quantitative measurement data (amplification rise time, copy number) (step S117). As shown in FIG. 16, this determination is, for example, [ND] when the copy number is compared with a standard range (step S301) and the copy number is within the first reference range (that is, 250 or less) or when the turbidity does not reach the threshold value even after the lapse of the predetermined time in the measurement data shown in FIG. 8, [+] when the copy number is within the second reference range (that is, from 250 to $5 \times 10^3$), and [++] when the copy number is in the third reference range (for example, greater than $5 \times 10^3$) (step S302). Here, "ND" indicates qualitative degree of cancer metastasis such as "no metastasis is detected", "+" means "slight metastasis", "++" means "metastasis is recognized". "Metastasis is positive" when the copy number is in the fourth standard range (for example, greater than 250) (step S303), and "metastasis is negative" when the copy number is in the first reference range or turbidity is less than the threshold value (step S304). By displaying a qualitative result useful for definitive diagnosis support from the quantitative measurement data (the amount of cancer-derived cells) by the sample analyzer 2000, the doctor can rapidly determine the excision range during the surgery. The processing unit 231a transmits the determination result 4010 to the server 4000 via the communication unit 231g (step S118). The processing unit 231a also displays the determination result 4010 on the output unit 232.

When the above determination is completed, the processing unit 231a may generate communication data for notifying the completion of the sample measurement (step S119), and may transmit the communication data to the server 4000 via the communication unit 231g (step S120). The communication data include an operation state code "5" indicating a sample measurement completion state and operation data 4040. The processing unit 231*a* also outputs the operation data to the output unit 232 (for example, the screen).

When stopping the operation of the sample analyzer 2000, for example, the user operates the input unit 233 of the data processing unit 230 and inputs a shutdown instruction. Upon receiving a shutdown instruction (step S121), the CPU 231*a* generates communication data for notifying of the shutdown of the sample analyzer 2000 and transmits the communication data to the server 4000 (step S122). The communication data include an operation state code "6" indicating the measurement unit end state. The processing unit 231*a* also generates operation data 4040 including an operation history such as the number of suction operations of the pipette of the sample analyzer 2000, and transmits the data to the server 4000 (step S123). Upon completion of the shutdown of the sample analyzer 2000, the processor 231*a* terminates the process.

3-7. Server Operation

The server 4000 performs the following processing in accordance with the operation of the sample analyzer 2000 described in section 3-6 above. The operation of the server 4000 will be described with reference to FIG. 15.

Figure 15:
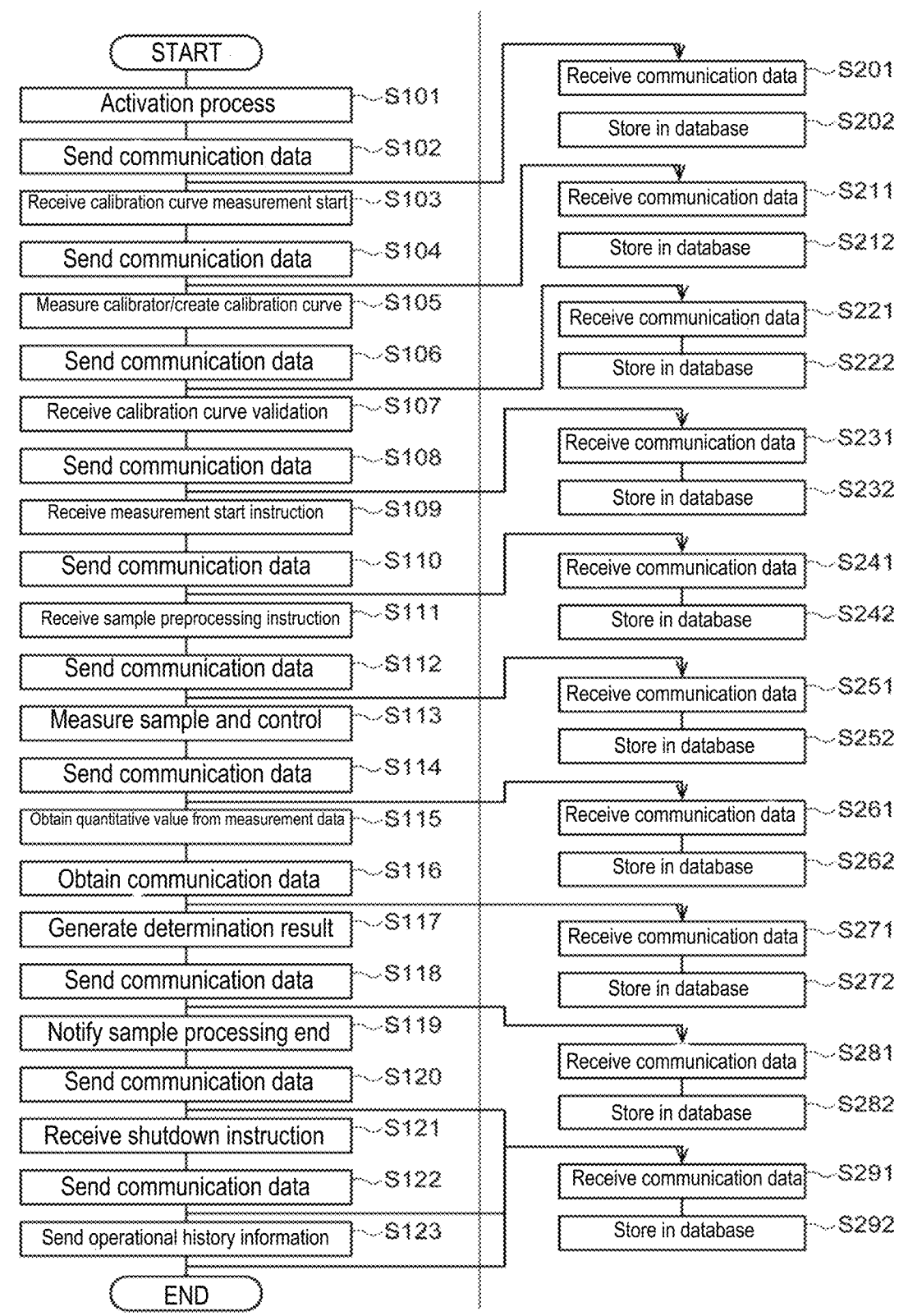
FIG. 15 is a flowchart showing the operation of a sample analyzer and a server.

The server 4000 receives the communication data related to the activation process transmitted in step S102 of FIG. 15 (step S201), and stores the communication data in the sample processing apparatus operational database 4040 (step S202).

The server 4000 receives the communication data relating to the calibration curve measurement start instruction transmitted in step S104 of FIG. 15 (step S211) and accumulates the communication data in the sample processing apparatus operational database 4040 (step S212).

Upon receiving the calibration data 4020 transmitted in step S106 of FIG. 15 (step S221), the server 4000 stores the data in the calibrator-control database 4100 (step S222). The server 4000 also performs statistical processing using a plurality of calibration data transmitted from a plurality of sample analyzers installed in each facility. Specifically, based on the data transmitted from the sample analyzers 2000 (the data processing units 230) installed in the plurality of facilities, the average value and the standard deviation 1SD in units of one day are obtained for each test item. The server 4000 also obtains 2SD which is double the standard deviation 1SD, and 3SD which is triple the standard deviation 1SD. The average values 1SD, 2SD, and 3SD of the measurement data in units of one day are accumulated in the quality control database 4050DB of the server 4000. Note that in the quality control database 4050DB, data of a reference machine which is a sample analyzer serving as a reference for quality control are also stored.

Upon receipt of the communication data concerning acceptance of the calibration curve validation (step S231) transmitted in step S108 in FIG. 15, the server 4000 stores the data in the calibrator-control database 4100 (step S232).

Upon receiving the communication data transmitted in step S108 of FIG. 15, the server 4000 determines whether the calibration curve preparation process is normal based on the calculated average value and 1SD, 2SD or 3SD. The 1SD, 2SD, 3SD are standard values regarding whether the received measurement data are normal, and which one of 1SD, 2SD, 3SD is used as the reference value is selected by each facility, and the selected reference value is used for determinations. The determination result is also registered in the quality control database 4050DB.

When the server 4000 receives the communication data relating to reception of the measurement start instruction (step S241) transmitted in step S110 of FIG. 15 (step S241), the server 4000 stores the data in the sample processing apparatus operational database 4040 (step S242).

Upon receiving the communication data related to acceptance of the sample preprocessing start instruction transmitted in step S112 of FIG. 15 (step S251), the server 4000 stores the data in the sample processing apparatus operational database 4040 (step S252).

Upon receiving the control data 4030 transmitted in step S114 of FIG. 15 (step S261), the server 4000 stores the data in the calibration-control database 4100 (step S262).

The server 4000 also performs statistical processing on a plurality of control data 4020 transmitted from a plurality of sample analyzers 2000 installed in each facility. Specifically, an average value and a standard deviation 1SD for each day are obtained based on the control data 4020 transmitted from the plurality of sample analyzers 2000 respectively. The server 4000 also obtains 2SD which is double the standard deviation 1SD, and 3SD which is triple the standard deviation 1SD. The average values 1SD, 2SD, and 3SD of the measurement data in units of one day are registered in the quality control database 4050DB in the server 4000. Control data obtained by measuring the control in the reference machine are also stored in the quality control database 4050DB.

Upon receiving the communication data related to the quantitative value transmitted in step S116 of FIG. 15 (step S271), the processing unit of the server 4000, also determines whether the sample measurement by the measuring unit is normal based on the calculated average value and 1SD, 2SD, or 3SD. More specifically, the server 4000 determines whether the sample measurement is normal based on the average value of the control data 4020 received during a predetermined past time (for example, the past 24 hours) and the standard deviation 1SD, 2SD, or 3SD. The 1SD, 2SD, 3SD are standard values regarding whether the received measurement data are normal, and which one of 1SD, 2SD, 3SD is used as the reference value is selected by each facility, and the selected reference value is used for determinations. The determination result is also recorded in the quality control database 4050DB (step S272).

Upon receiving the communication data related to the determination result 4010 transmitted in step S118 of FIG. 15 (step S281), the server 4000 stores the determination result 4010 in the determination result database 4010DB (step S282). If necessary, the processing described in section 3-7 below may be performed.

When receiving the communication data transmitted in steps S120, S122, and S123 of FIG. 15 (step S291), the server 4000 stores the communication data in the sample processing apparatus operational database 4040 (step S291).

3-8. Generating Apparatus Operation

The generating apparatus 3000 generates quality control data 4050 based on the determination result 4010 generated by the sample analyzing apparatus 2000. The description of each term in section 1-1 above is incorporated herein.

Figure 17:
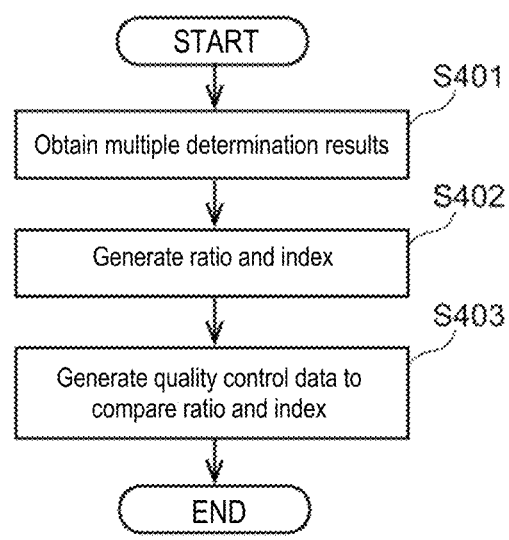
FIG. 17 is a flowchart showing steps of a ratio calculation process in an apparatus for generating a quality control index.
Figure 18:
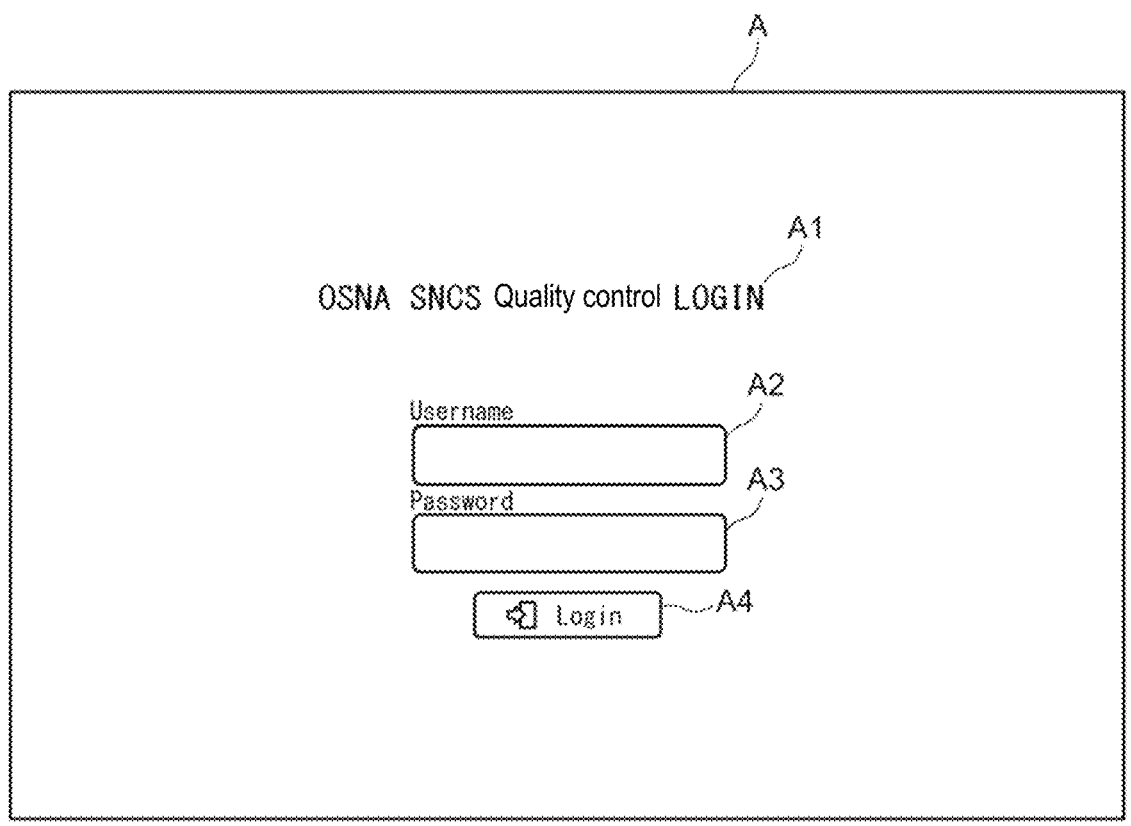
FIG. 18 is an example of a screen for logging in to a screen for displaying output data.

An example of the process of generating the quality control data 4050 will be described with reference to FIG. 17. First, the processing unit 710*a* of the generating apparatus 3000 acquires a plurality of determination results 4010 for the same test item from the server 4000 or from the plurality of sample analysis devices 2000 (step S401). Next, in accordance with the method described in section 1-1 above, the processing unit 710*a* calculates a ratio of the sample determined to be positive or negative by the plurality of sample analyzers based on a plurality of determination results acquired from the plurality of sample analyzers, and generates an index based on the ratio (step S402). The processing unit 710a stores the calculated ratio in the storage unit. The processing unit 710a generates the quality control data 4050 (user interface) to compare the ratio and the index generated based on the ratio acquired from the plurality of sample analyzers up to the point of generating the index stored in the auxiliary storage unit 710d of the generating apparatus 3000 (step S403). The generated quality control data 4050 are stored in the auxiliary storage unit 710d of the generating apparatus 3000 or transmitted to the server 4000 through the communication unit 710g of the generating apparatus 3000. The processing of steps S401 to S403 also may be performed on all acquired determination results 4050 or may be performed for each predetermined group.

4. Display Example of User Interface Screen

An example of a method of displaying output data will be described with reference to FIGS. 18 to 31. In this example, the information area of the reference sample, the information area of the operation, and the area of the ratio are displayed in association with one area.

First, an operator (administrator) or the like of the management facility activates a monitoring data generating apparatus 3000 (hereinafter, also simply referred to as "generating apparatus 3000") installed in a management facility such as a service center, and a login screen A to the monitoring system shown in 18 is displayed on the output unit 720. On the login screen A, for example, an area A1 for displaying a system name, an area A2 for inputting a user name, an area A3 for inputting a password, and a login area A4 are included. When the operator inputs the user name and password from the input unit 730 and selects the login area, the screen is switched to the screen B displaying the list of one or more sample analyzers 2000 shown in FIG. 19.

The screen B includes, for example, a search keyword input area B1 which allows entering of a facility name, a serial number or the like, a pull-down area B2 which allows selecting a facility name or a model name, a list B3 of the sample analyzers 2000, a weekly report area B5 for displaying the internal quality control on a weekly basis, a positive rate report area B6 for displaying a report screen showing the positive rate of the presence or absence of a disease reflected by the examination item, and a log off area B4 selected at the time of canceling the login state. The screen B displaying the list of the sample analyzers 2000 also may display a warning B7 for informing the operator of the facility where the quality control failure is detected.

In the list B3 of the sample analyzer 2000, in addition to the facility name (including branch name) and the serial number of the model of the sample analyzer 2000, for example, the state of the sample analyzer 2000 at each facility at the time the operator logged in (status), the date and time when the status is reached, the model name and/or nickname of the sample analyzer 2000, the version information of analysis software installed in the data processing unit 230 of the sample analyzer 2000 and the like also may be included.

The list B3 of the sample analyzer 2000 includes an area B8 for indicating detailed monitoring information of each sample analyzer 2000. By selecting this area B8, it is possible to view the monitoring data of the present disclosure.

Figure 20:
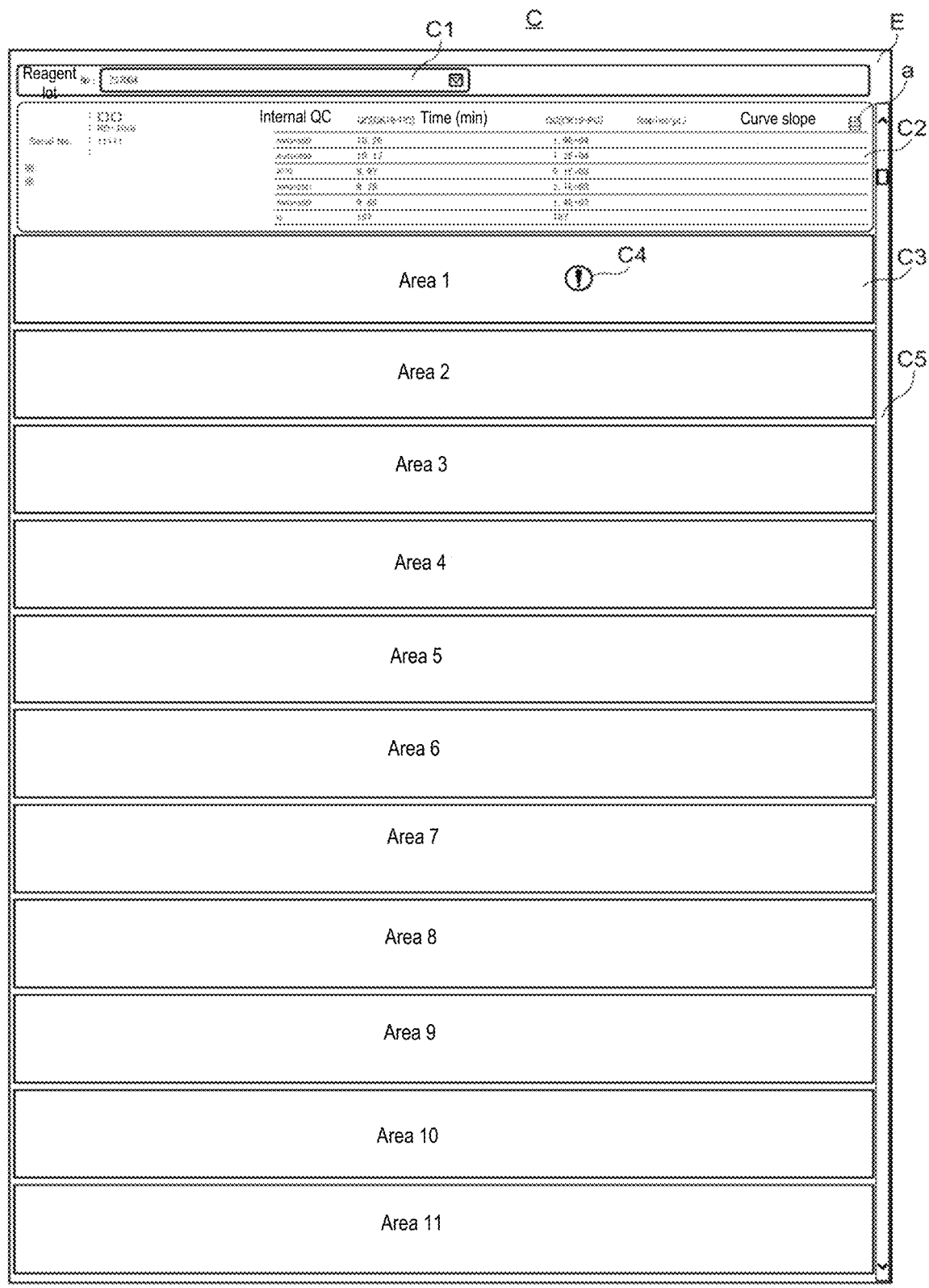
FIG. 20 is an example of a case in which output data are shown in one area.

When the region B8 is selected, a screen is displayed for the output of output data (user interface data) C to display an area (standard information information area) where the information of the standard sample can be viewed, and an area (operational information area) where the information of the operation at the time of acquiring the measurement data can be viewed (FIG. 20). On the screen displayed by the output data C, for example, in one area E, a pull-down key C1 for selecting a reagent lot with a pull-down list, a display area C2 for numerically indicating information on internal quality control of each sample analyzer 2000, and/or a plurality of display areas C3 (areas 1 to 11) in which time series data of either the information area of the standard sample or the information area of the operation is indicated by a graph or the like. A warning C4 also may be displayed in the information in which the quality control failure information is detected. C5 indicates a scroll key for scrolling the area E and changing the display position.

Next, an example of each display area C3 will be described by way of example in which the expression level of CK-19 is used as an examination item.

Figure 21:
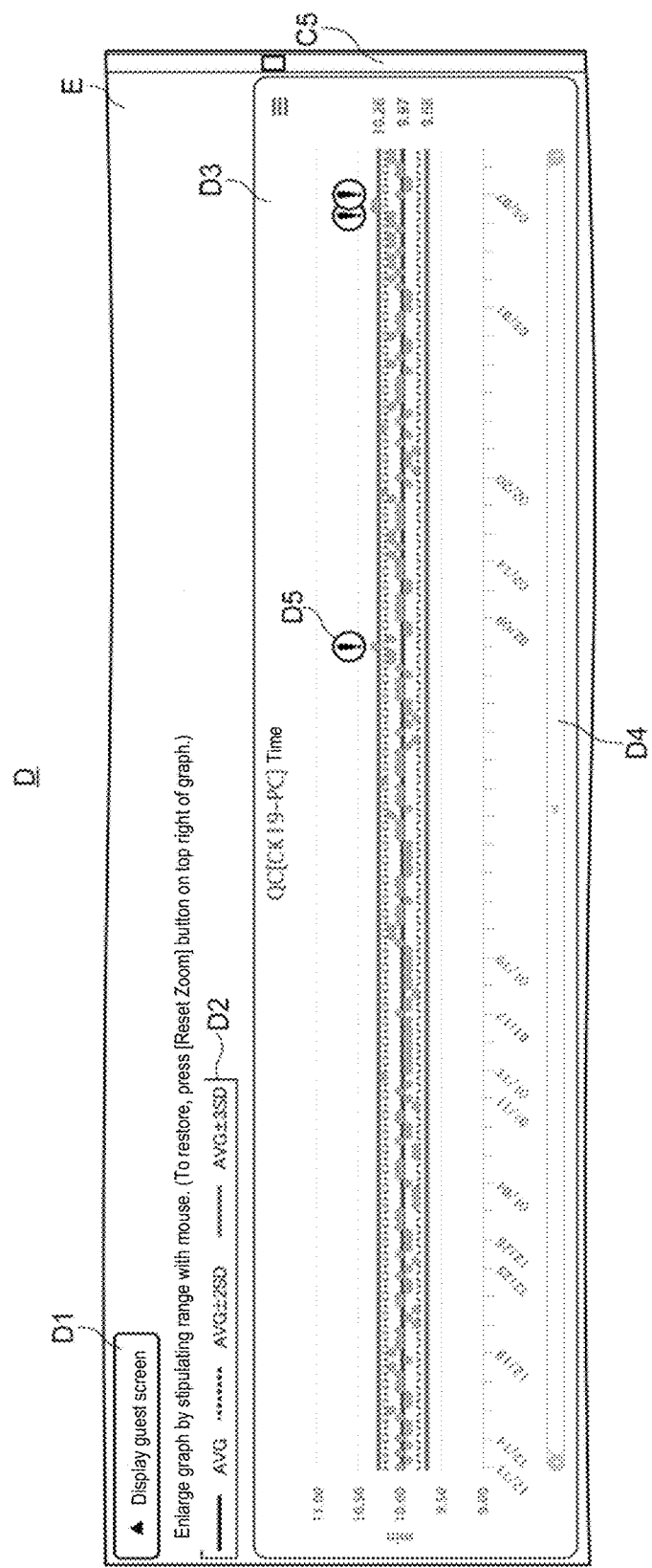
FIG. 21 is a display example of information indicated in one area.

FIG. 21 shows an example of the time series graph region D of the detection time of the turbidity of a positive control. The time-series graph region D includes a graph region D3, a selection region D4 for changing the display region of the graph, a legend region D2 for explaining lines or marks displayed on the graph, and a selection area D1 for indicating information in a format that the user views. The points in the graph indicate values reflecting the information of the respective standard samples at the time of acquisition by the analyzer 3000 (the same applies to this disclosure in the following description). A warning D5 also may be displayed in the information in which the quality control failure is detected.

Figure 22:
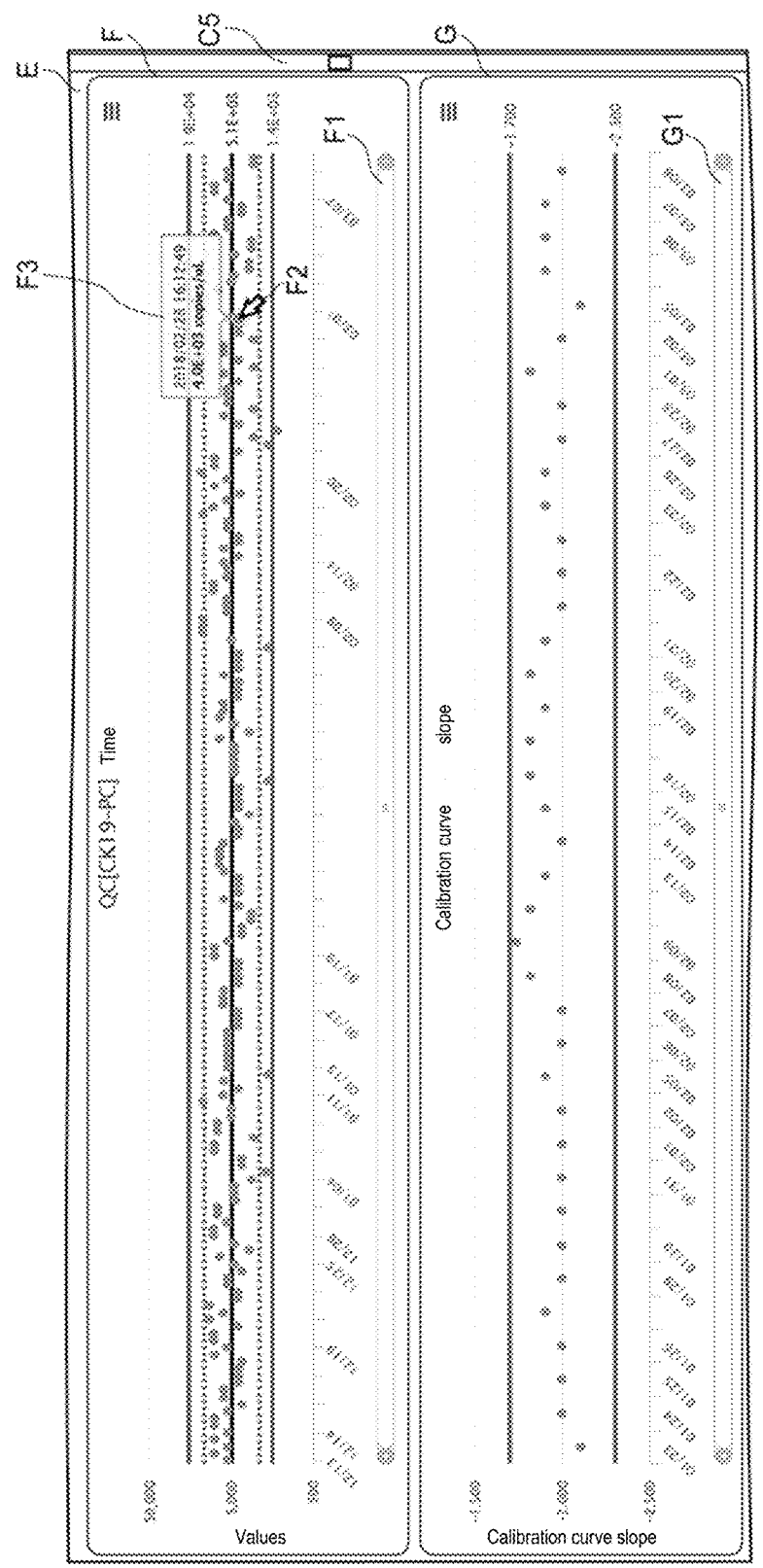
FIG. 22 is a display example of information indicated in one area.

FIG. 22 exemplifies the display area F of the graph showing the quantitative values of the positive control in chronological order. The display area F may include a selection area F1 for changing the display area of the graph. In addition, FIG. 22 exemplifies a display region G of a graph showing the slope of the calibration curve in chronological order when the expression level of CK-19 is used as an examination item. The display area G also may include a selection area G1 for changing the display area of the graph.

Figure 23:
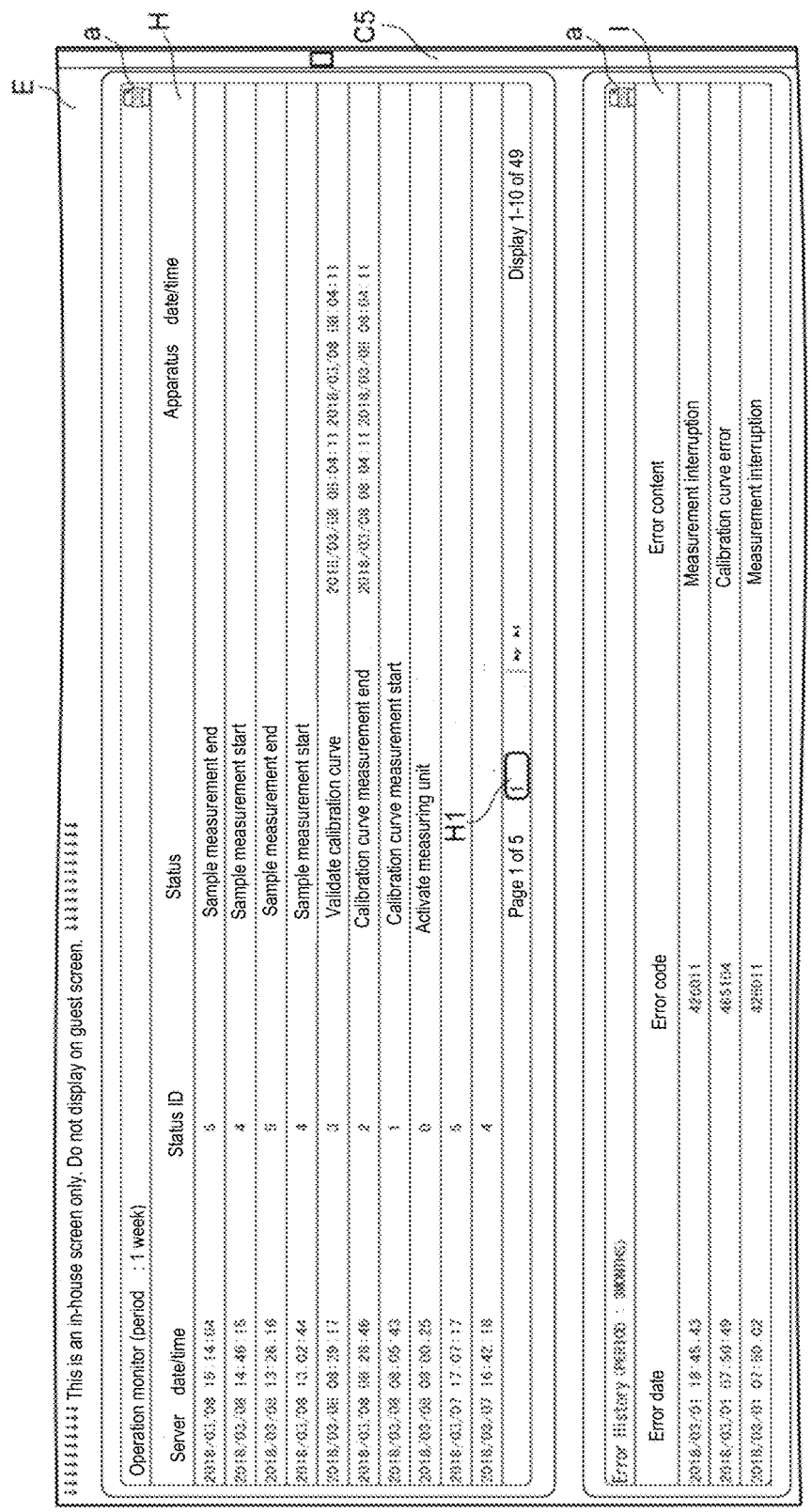
FIG. 23 is a display example of information indicated in one area.

FIG. 23 exemplifies a display area H showing a list of statuses of each sample analyzer 2000 and a display area I showing a list of error histories of each sample analyzer 2000. A list selection area H1 for changing the display area of each list also may be displayed on each page. In the display area H, the contents of the status indicating the operational state of each sample analyzer 2000, the status ID for identifying and displaying different status, the date and time when the server 4000 received the status and the like are displayed. A selection area a (used below in this disclosure and the following description) for selecting a process for outputting the list as a CSV file, for example, also may be displayed. The contents of the measurement failure (error) detected by each sample analyzer 2000, the error code for identifying and displaying each error, the date and time at which the error was detected and the like are shown in the display area I.

FIG. 24 exemplifies the display area J showing the contents of the error. A list selection area J1 for changing the display area of each list may be displayed. In the display area J, a test item in which an error is detected, a message indicating that an error is detected in a standard sample or a sample, a message indicating an estimated cause of the error, or the like may be displayed. FIG. 32 shows the relationship between the error pattern and the cause of the error. The quality control failure and the operational abnormality of the sample analyzer 2000 can be determined by comparing with the predetermined reference range corresponding to each datum. That is, it is satisfactory if it is within the standard range, and it can be determined as defective if it is outside the standard range.

Figure 25:
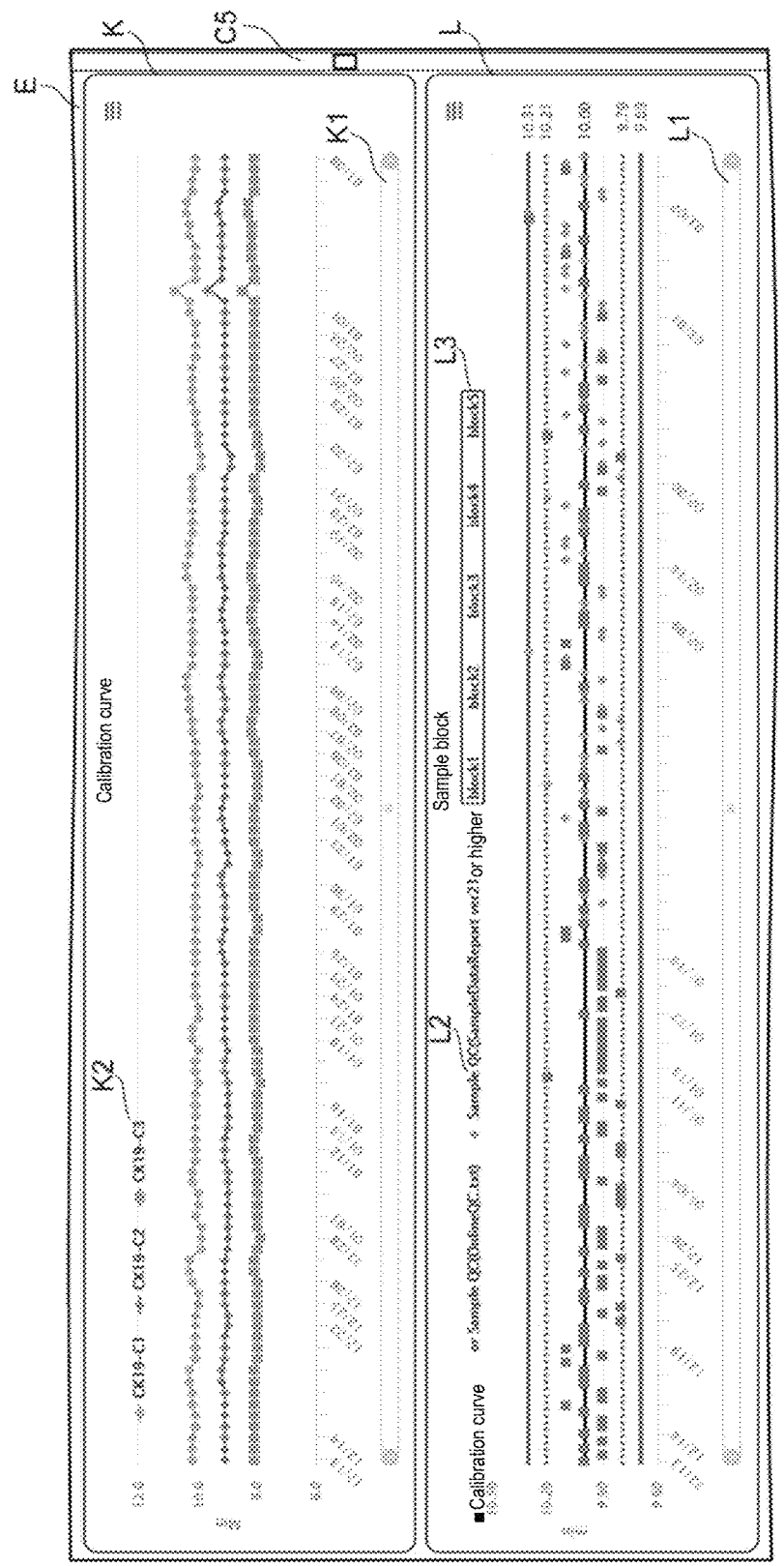
FIG. 25 is a display example of information indicated in one area.

FIG. 25 exemplifies a display area K of a graph showing measured values of each calibrator in time series when a calibration curve is created. The display area K also may include a selection area K1 for changing the display area of the graph. A legend area K2 indicating the origin of each graph also may be displayed. In addition, FIG. 25 exemplifies a display region L of a graph in which measured values of positive control in each block 65 are displayed in chronological order when the expression level of CK-19 is used as an examination item. The display area L may include a selection area L1 for changing the display area of the graph. A legend area L2 indicating the origin of each graph also may be displayed. In addition, a block display area L3 for switching the display for each block may be included.

Figure 26:
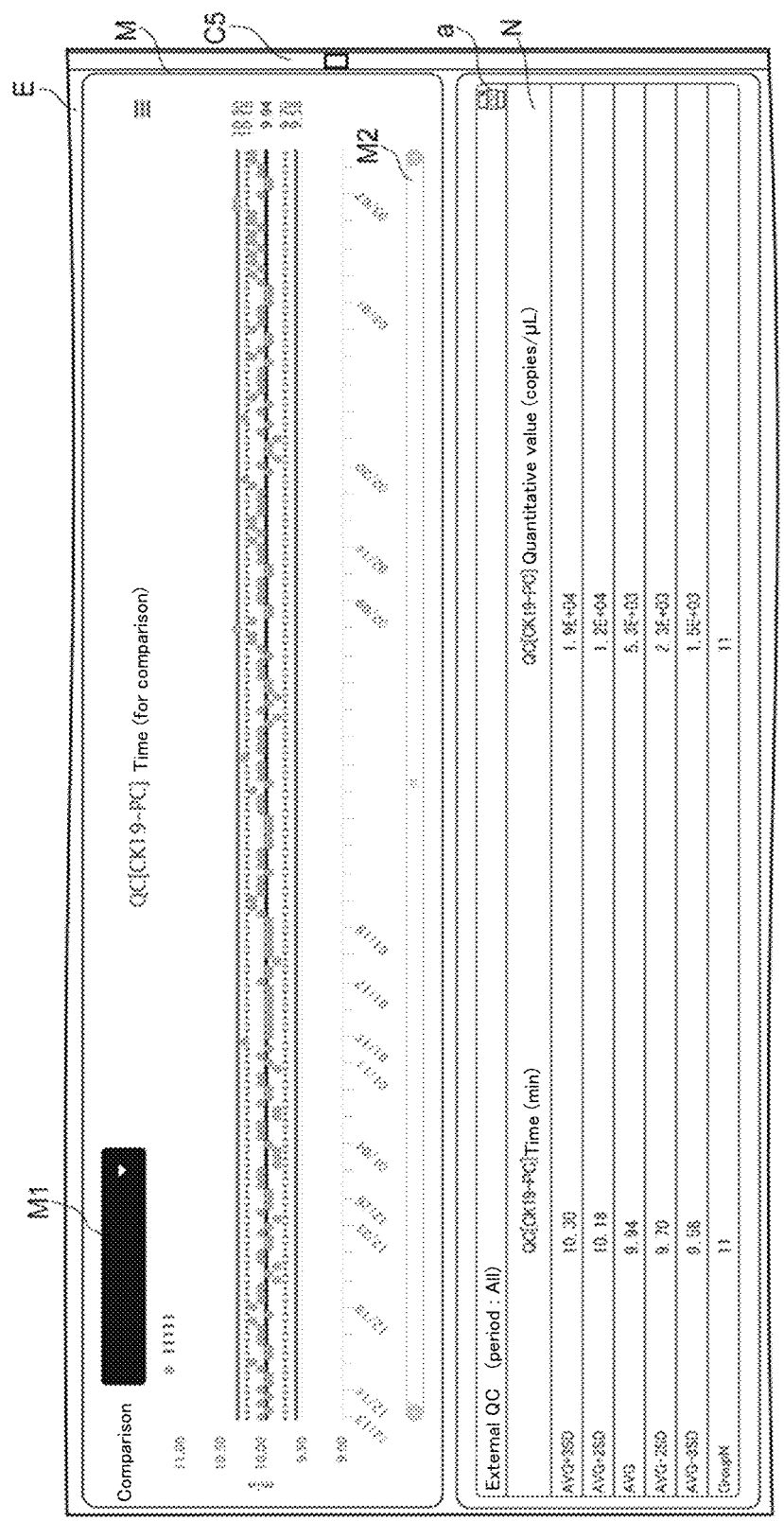
FIG. 26 is a display example of information indicated in one area.

FIG. 26 exemplifies a comparative display area M for the operator to confirm the rise time of the turbidity of the positive control in each sample analyzer 2000. The region M also may include a pull down region M1 for switching the rise time of the turbidity of the positive control in each of the sample analyzers 2000 displayed in the region M and a selection region M2 for changing the display region of the graph. FIG. 26 shows an example illustrating an external quality control list N for comparing the accuracy of each sample analyzer 2000 among the sample analyzers 2000. The external quality control list N may include the rise time of the turbidity of the positive control, the quantitative value of the positive control, and the like.

Figure 27:
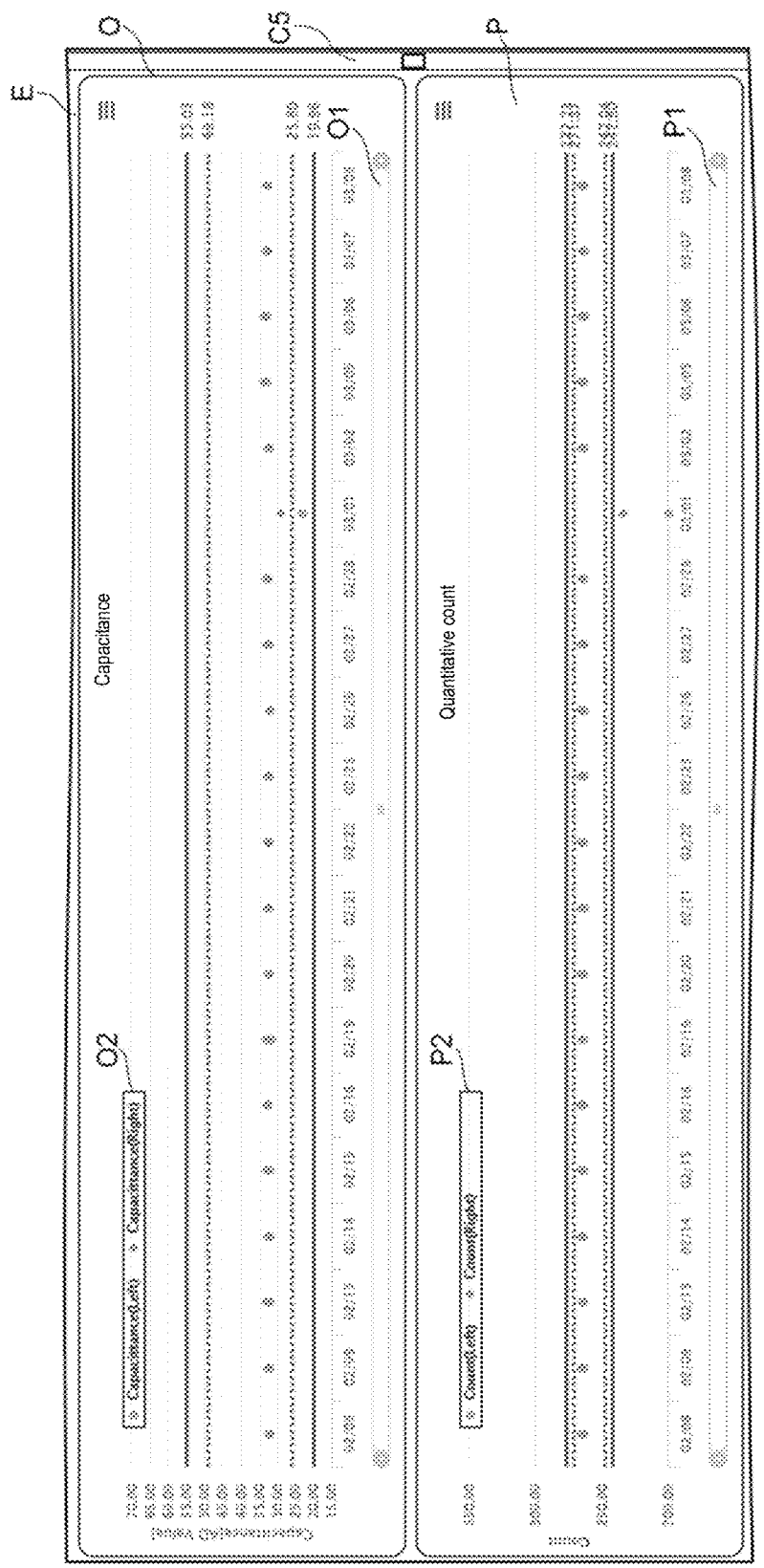
FIG. 27 is a display example of information indicated in one area.

FIG. 27 exemplifies a capacitance display area O for showing the electrostatic capacity in time series as an example showing the operation of each sample analyzer 2000 in chronological order. The electrostatic capacitance is information for detecting whether the pipette tip is properly attached to the suction nozzle. The display area O also may include a selection area O1 for changing the display area of the graph. A legend region O2 indicating the origin of each graph may be displayed. FIG. 27 exemplifies the display area P of the quantitative count of how many times the sample analyzer 2000 has suctioned the sample, the standard sample, or the reagent. The quantitative count, together with the reagent remainder amount, is used to evaluate whether each liquid has been dispensed in the correct amount. The display area P also may include a selection area P1 for changing the display area of the graph. A legend area P2 indicating the origin of each graph may be displayed.

FIG. 28 exemplifies a display area Q that displays a list of software version information attached to the data processing unit 230 of each sample analyzer 2000. In the display area Q, software program name, program version, program update date and time and the like may be displayed.

In addition, FIG. 28 exemplifies a display region R for displaying a list of calculation results of the positive rate calculated on the basis of the determination results that the lesion is positive in the body of the subject for each sample. In the display region R, the information (target) of the population for which the positive rate was calculated, the date and time of aggregation start, the date and time of aggregation completion, the number of devices, the total number of lymph nodes, the number of negatives, the number of positives, and the positive rate may be displayed.

Figure 29:
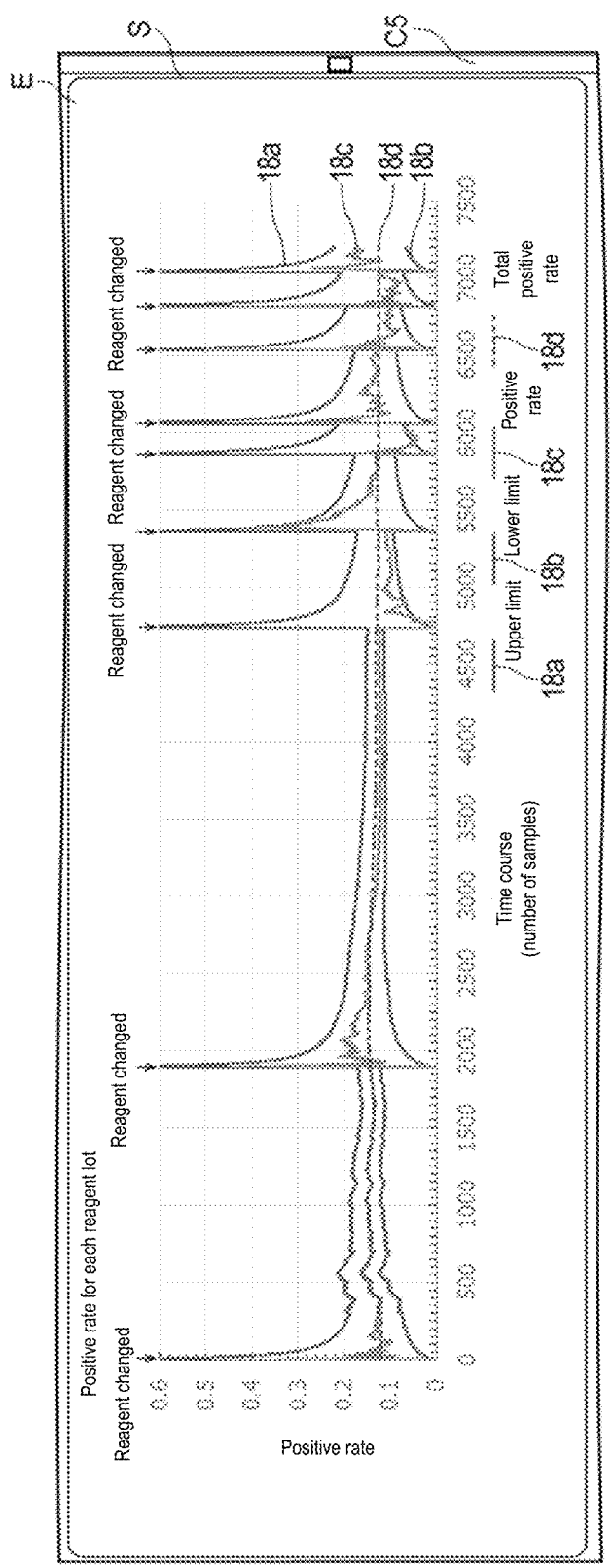
FIG. 29 is a display example of information indicated in one area.

FIG. 29 exemplifies a display region in which the positive rates of lymph node metastasis of breast cancer for each lot of reagent are graphically shown in time series. In FIG. 29, the arrows indicate the time when the reagent exchange is performed, that is, the time when the reagent lot has changed. In FIG. 29, reference numeral 18a indicates the upper limit value of the 99.7% confidence interval. Reference numeral 18b indicates the lower limit value of the 99.7% confidence interval. Reference numeral 18c indicates the transition of the positive rate of the determination result actually acquired from the sample. Reference numeral 18d indicates the transition of the positive rate in all determination results acquired irrespective of the reagent lot.

Immediately after the reagent lot has changed, the upper limit value and the lower limit value of the 99.7% confidence interval tend to be large because the number n of determination results is small. However, it decreases as the number n of determination results accumulate. Therefore, when considering the reagent lot, it is necessary to monitor the accuracy in another group immediately after reagent replacement.

Figure 30:
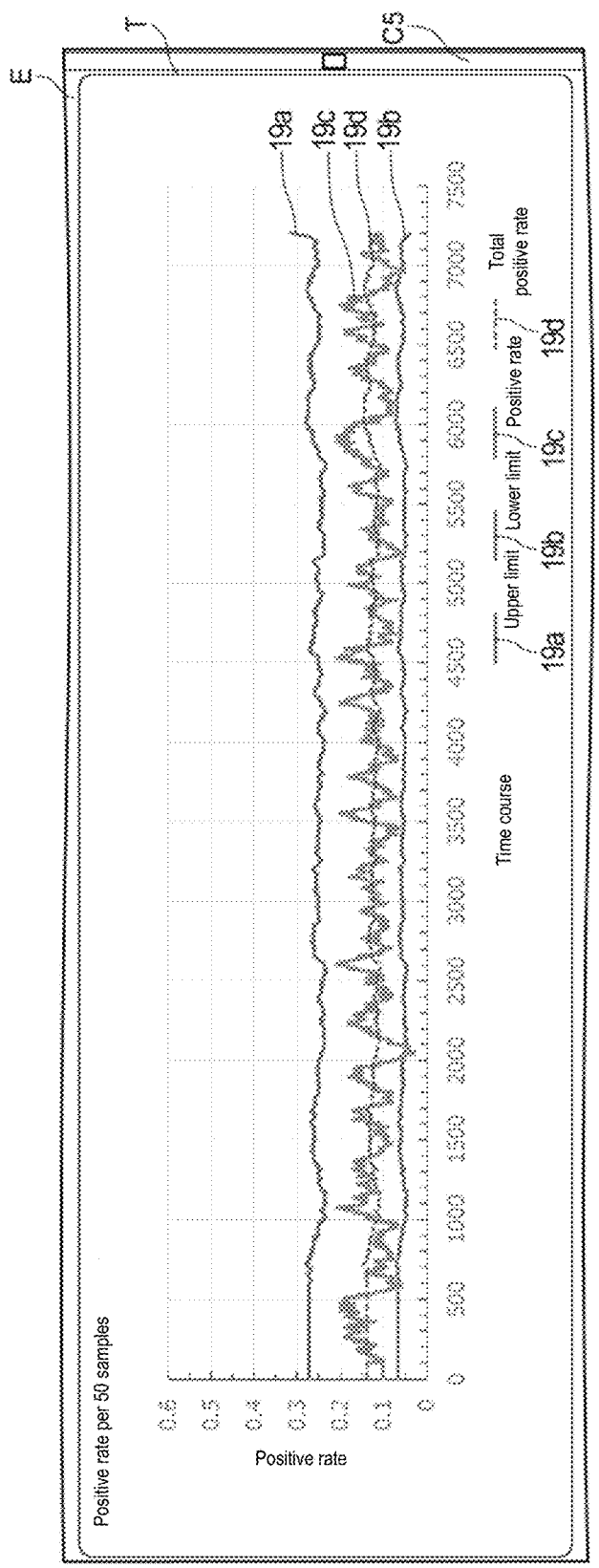
FIG. 30 is a display example of information shown in one area.

FIG. 30 exemplifies a display area showing the positive rate of lymph node metastasis of breast cancer in time series for each 50 samples. In FIG. 30, reference numeral 19a indicates the upper limit value of the 99.7% confidence interval. Reference numeral 19b indicates the lower limit value of the 99.7% confidence interval. Reference numeral 19c indicates the transition of the positive rate of the determination result actually obtained from the sample. Reference numeral 19c indicates the transition of the positive rate of the determination result actually obtained from the sample. Reference numeral 19d indicates the transition of the positive rate in all determination results acquired regardless of the reagent lot.

It is shown that when the accuracy is monitored with a positive rate every predetermined number of samples, the upper limit value and the lower limit value of the 99.7% confidence interval are stable. Therefore, quality control can be performed without being affected by reagent replacement or the like by monitoring the accuracy for each predetermined number of samples.

Figure 31:
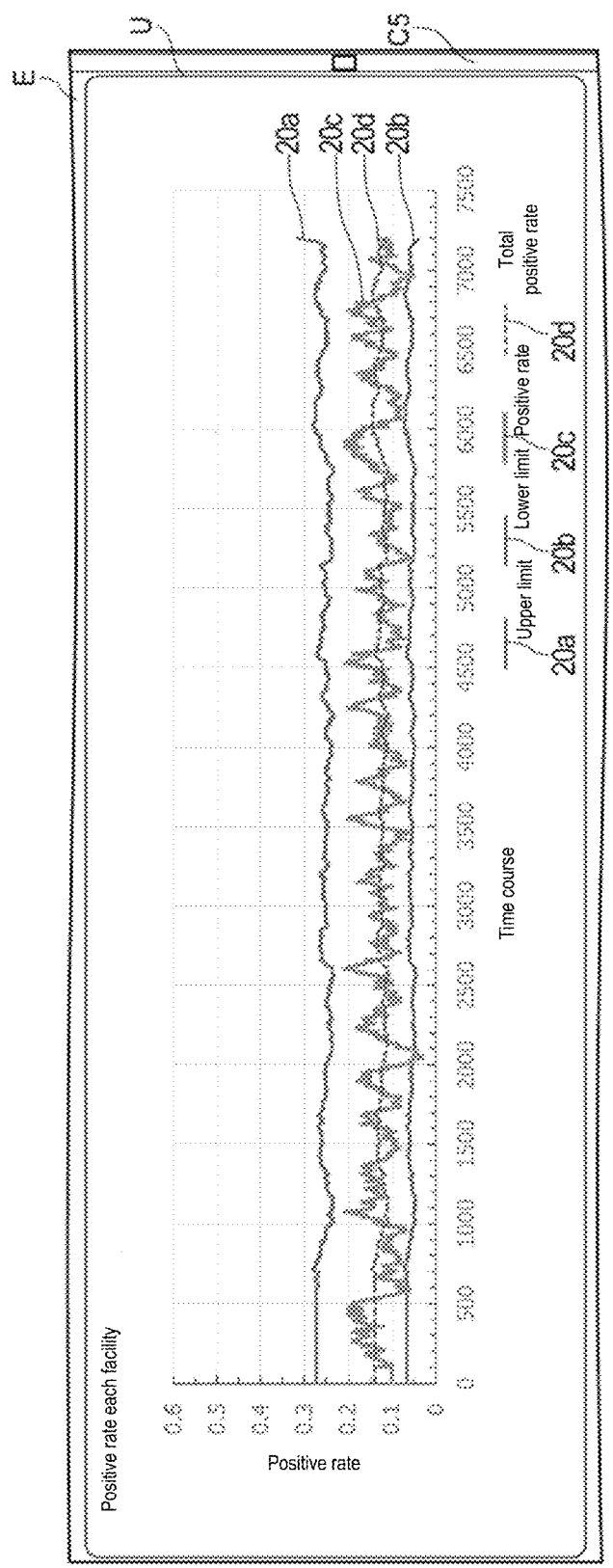
FIG. 31 is a display example of information shown in one area.

FIG. 31 exemplifies a display area that graphically shows the positive rate of lymph node metastasis of breast cancer for each facility in a time series. In FIG. 31, reference numeral 20a indicates the upper limit value of the 99.7% confidence interval. Reference numeral 20b indicates the lower limit value of the 99.7% confidence interval. Reference numeral 19c indicates the transition of the positive rate of the determination result actually obtained from the sample. Reference numeral 20 c indicates the transition of the positive rate of the determination result actually obtained from the sample.

It is shown that when the accuracy is monitored with a positive rate every predetermined number of samples, the upper limit value and the lower limit value of the 99.7% confidence interval are stable. Therefore, quality control can be performed without being affected by reagent replacement or the like by monitoring the accuracy of the overall determination result.

Further, in each display area, for example, a warning D5 indicating a time point at which a quality control failure has occurred as shown in FIG. 21, a cursor F2 for selecting each legend in each display area, an area F3 indicating the specific measurement data of the information, the date and time when the measurement data was acquired and the like may be displayed.

In the present disclosure, the output data may be generated for each test item, and one area may include information on a standard sample for a plurality of test items. It is preferable that the plurality of test items can be acquired by the same sample analyzer 2000 when information on standard samples for a plurality of test items is included in one area. In the present disclosure, the output data also may be data that display ratios acquired from two or more managed sample analyzers 2000 having different measurement principles for the same test item in one area. The output data also may be data for displaying in one area a ratio acquired from two or more sample analyzers 2000 to be managed with the same measurement principle for the same examination item and different models.

4. Verification of the Effect of the Present Disclosure

Figure 33:
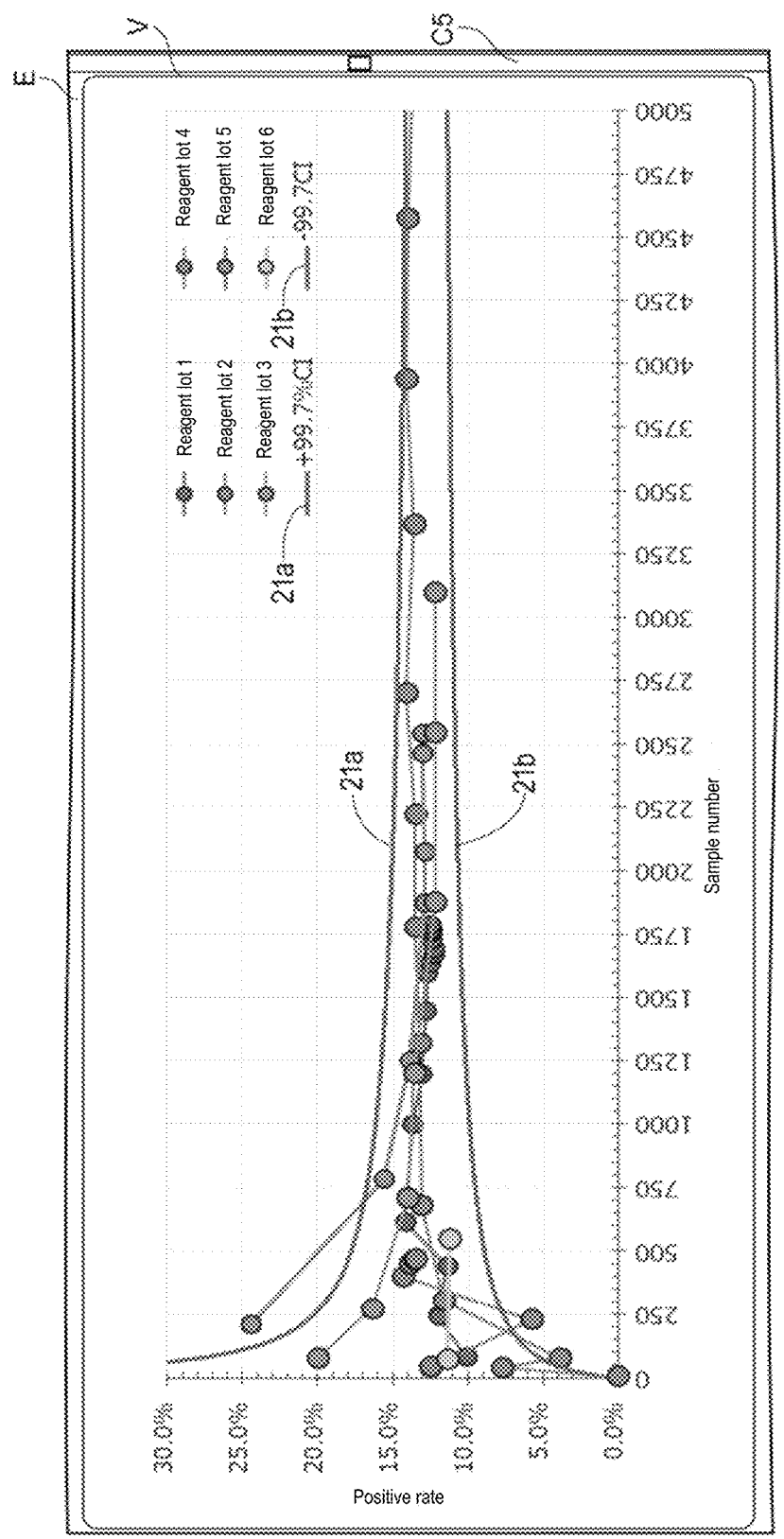
FIG. 33 is a graph showing the positive ratio of each facility in time series.

As shown in FIG. 33, regarding the determination results acquired by the generating apparatus 3000, positive ratios were obtained for each population using a group for each reagent lot as a population, and as a result, the positive rate of each reagent lot was 99.7% reliable. In FIG. 33, reference numeral 20*a* indicates the upper limit value of the 99.7% confidence interval. Reference numeral 20*b* indicates the lower limit value of the 99.7% confidence interval.

The estimation formula of the range of the population ratio (confidence interval) is as follows.

$$\frac{n}{n+Z^2}\left(p+\frac{Z^2}{2n}\pm Z\sqrt{\frac{p(1-p)}{n}+\frac{Z^2}{4n^2}}\right) \quad \text{Function 2}$$

(In the formula, n represents the number of samples after the reagent lot was changed, p represents the average value of the cumulative samples, and Z represents a constant).

What is claimed is:

1. A generation method for generating an index for managing analysis accuracy of a sample analyzer, comprising:
    a step of obtaining a determination result regarding whether a sample is positive or negative from each of a plurality of sample analyzers;
    a step of obtaining information on at least one reagent lot; and
    a step of generating an index based on a positive or negative ratio among a plurality of determination results obtained from the plurality of sample analyzers,
    wherein the positive or negative ratio is obtained for each reagent lot.

2. A generation method of generating quality control data for managing analysis accuracy of a sample analyzer, comprising:
    a step of obtaining a determination result regarding whether a sample is positive or negative from each of a plurality of sample analyzers;
    a step of obtaining information on at least one reagent lot;
    a step of generating an index based on a first ratio, the first ratio being a positive or negative ratio among a plurality of determination results obtained from the plurality of sample analyzers; and
    a step of displaying quality control data in which the index is displayed comparable with a second ratio, the second ratio being a positive or negative ratio among the determination results obtained from a target sample analyzer,
    wherein the first ratio and the second ratio are obtained for each reagent lot.

3. The generation method according to claim 2, wherein the first and second ratios are calculated for each of a predetermined number of samples.

4. The generation method according to claim 2, wherein the index is updated each time one of the at least one reagent lot is changed for acquiring measurement data.

5. The generation method according to claim 2, wherein the index varies depending on a number of cumulative samples up to the time of generating the index.

6. The generation method according to claim 2, wherein the index is calculated based on an average value of ratios acquired from the plurality of sample analyzers by the time of generating the index, the ratios including the first ratio.

7. The generation method according to claim 2, wherein the index is at least one selected from an upper limit value or a lower limit value of a confidence interval.

8. The generation method according to claim 2, wherein the determination result is acquired for a plurality of test items, and the first and second ratios are acquired for each test item.

9. The generation method according to claim 2, wherein the quality control data are displayed on a screen in chronological order.

10. The generation method according to claim 2, wherein the quality control data include measurement data acquired from a standard sample by the sample analyzer to be managed.

11. The generation method according to claim 2, further comprising:
    a step of acquiring identification information of a predetermined group which is set for each facility where a sample analyzer is installed; and
    wherein the first and second ratios are calculated for each predetermined group.

12. The generation method according to claim 2, wherein the quality control data are user interface data for showing the first and second ratios and the index obtained from the sample analyzer to be managed in a time-series graph.

13. A generating apparatus for generating an index for managing analysis accuracy of a sample analyzer, the generating apparatus comprising:
    a communication unit configured to acquire a determination result regarding whether a sample is positive or negative from each of a plurality of sample analyzers, and to acquire information on at least one reagent lot; and
    a processing unit configured to generate an index based on a positive or negative ratio among a plurality of determination results acquired from the plurality of sample analyzers via the communication unit,
    wherein the generating apparatus is configured to acquire the positive or negative ratio for each reagent lot.

14. The generating apparatus according to claim 13, wherein
    the processing unit is configured to generate quality control data for comparing the index with a ratio of samples determined to be positive or negative by the sample analyzer to be managed for analysis accuracy.

15. A system for generating quality control data, comprising:
    the generating apparatus according to claim 13; and the plurality of sample analyzers connected to the generating apparatus.

16. A method of constructing a system for generating quality control data, comprising steps of:
    preparing a generating apparatus according to claim 13; and
    preparing a plurality of sample analyzers connected to the generating apparatus.

* * * * *